United States Patent
Yenduri et al.

(10) Patent No.: US 11,689,115 B2
(45) Date of Patent: Jun. 27, 2023

(54) BIDIRECTIONAL AC-DC CONVERTER WITH MULTILEVEL POWER FACTOR CORRECTION

(71) Applicant: The Research Foundation for The State University of New York, Binghamton, NY (US)

(72) Inventors: Kalyan Yenduri, Narakodur (IN); Sunil Dube, Vestal, NY (US); Pritam Das, Vestal, NY (US); Benson Chan, Vestal, NY (US)

(73) Assignee: The Research Foundation for The State University o, Binghamton, NY (US)

( * ) Notice: Subject to any disclaimer, the term of this patent is extended or adjusted under 35 U.S.C. 154(b) by 0 days.

(21) Appl. No.: 17/449,875

(22) Filed: Oct. 4, 2021

(65) Prior Publication Data

US 2022/0109381 A1 Apr. 7, 2022

Related U.S. Application Data

(60) Provisional application No. 63/087,174, filed on Oct. 2, 2020.

(51) Int. Cl.
| | | |
|---|---|---|
| *H02M 5/458* | (2006.01) | |
| *H02M 7/487* | (2007.01) | |
| *H02M 7/48* | (2007.01) | |
| *H02J 7/00* | (2006.01) | |
| *H02M 7/797* | (2006.01) | |

(Continued)

(52) U.S. Cl.
CPC ........... *H02M 5/458* (2013.01); *H02M 7/487* (2013.01); *H02M 7/4807* (2013.01); *H02J 7/007* (2013.01); *H02J 2207/20* (2020.01); *H02M 1/4241* (2013.01); *H02M 5/225* (2013.01);

(Continued)

(58) Field of Classification Search
CPC ...... H02M 1/4241; H02M 3/01; H02M 5/225; H02M 5/293–297; H02M 5/458–4585; H02M 7/4807; H02M 7/4815; H02M 7/483; H02M 7/487; H02M 7/797; H02J 7/007; H02J 2207/20
See application file for complete search history.

(56) References Cited

U.S. PATENT DOCUMENTS

| | | | | |
|---|---|---|---|---|
| 6,058,031 A | * | 5/2000 | Lyons | ........... H02M 7/487 363/67 |
| 10,998,825 B2 | * | 5/2021 | Toliyat | ............ H02M 3/33584 |

(Continued)

*Primary Examiner* — Fred E Finch, III
(74) *Attorney, Agent, or Firm* — Hoffberg & Associates; Steven M. Hoffberg

(57) ABSTRACT

A multilevel stage of a bidirectional AC power converter, comprising: a set of switches in series, a set of capacitors in series, the set of capacitors being in parallel with the set of switches; a number of sets of diodes in series; a center tap along the set of switches in series; and a pair of taps, respectively after the first and before the last switch of the set of switches in series; wherein each node between respective capacitors is connected to a node between respective diodes. A converter first stage for a 3-level converter has 6 switches, two capacitors, and two diodes, with the junction between diodes connected to the junction between capacitors, and the diode legs between switches 2-3 and 4-5. The center tap is between switches 3-4, and the pair of taps between switches 1-2 and 5-6.

20 Claims, 15 Drawing Sheets

(51) Int. Cl.
  *H02M 1/42*    (2007.01)
  *H02M 5/22*    (2006.01)
  *H02M 5/293*   (2006.01)

(52) U.S. Cl.
  CPC .......... *H02M 5/293* (2013.01); *H02M 7/4815* (2021.05); *H02M 7/797* (2013.01)

(56) References Cited

U.S. PATENT DOCUMENTS

| | | | |
|---|---|---|---|
| 2005/0111246 A1* | 5/2005 | Lai | H02M 5/4585 |
| | | | 363/157 |
| 2006/0152085 A1* | 7/2006 | Flett | H02M 7/003 |
| | | | 307/75 |
| 2017/0085183 A1* | 3/2017 | Notsch | H02M 1/44 |
| 2017/0237339 A1* | 8/2017 | Young | H02M 1/4225 |
| | | | 363/126 |
| 2018/0269684 A1* | 9/2018 | Mondal | H02M 7/483 |
| 2020/0044562 A1* | 2/2020 | Alipour | H02M 1/4233 |
| 2020/0412238 A1* | 12/2020 | Zhu | H02M 1/4216 |
| 2021/0126550 A1* | 4/2021 | Yenduri | H02M 7/217 |
| 2021/0152080 A1* | 5/2021 | Lukic | H02H 3/02 |
| 2021/0359594 A1* | 11/2021 | Zhang | H02M 1/12 |

* cited by examiner

AC Ports: zO and xO.

BIDIRECTIONAL AC-DC CONVERTER WITH MULTILEVEL POWER FACTOR CORRECTION

CROSS REFERENCE TO RELATED APPLICATIONS

The present application is a non-provisional of, and claims benefit of priority under 35 U.S.C. § 119(e) from, U.S. Provisional Patent Application No. 63/087,174, filed Oct. 2, 2020, the entirety of which is expressly incorporated herein by reference.

FIELD OF INVENTION

The present invention relates to the field of bidirectional power electronic converters, and more particularly to such a power converter having an efficient architecture.

BACKGROUND OF THE INVENTION

Each reference cited herein is expressly incorporated herein by reference in its entirety.

In a conventional two-stage AC-DC resonant converter, a three-phase active front-end (AFE) boost power factor correction (PFC) rectifier feeds an interleaved three phase resonant converter. The input is a low frequency AC power signal, e.g., 50-400 Hz. The resonant converter part contains a high frequency AC converter followed by a rectifier stage. In the traditional approach, the AC-AC part of the converter requires twelve semiconductors, out of which six are hard-switched, limiting the switching frequency and hence reducing the power density.

This invention pertains mainly to improvements in the first stage, and is usable with various architectures for the second stage, including both resonant and non-resonant designs. However, advantageously, the second stage is resonant.

AC-DC converters play a crucial role when the supplied grid or AC transmitted electric power is consumed or employed in the DC form, or where the available AC waveform is inappropriate and is therefore converted to another waveform with a DC intermediate power form. With the advent of Energy Storage (ES) applications, renewable energy sources, Electric Vehicles (EVs) and More Electric Aircrafts (MEA), the demand for high power density (>30 W/in$^3$), high efficiency (>95%) for compact AC-DC converters with the power rating more than 20 kW is increasing (1-4). LED illumination also requires relatively high currents, and dimming of illumination is typically my modulating the waveform rather than altering the peak drive voltage. While the main applications are high power uses, the architecture may also be used for low power, micropower, and energy harvesting applications.

Most of the AC to DC converters follow a two-stage design approach, wherein the first stage is a Power Factor Correction (PFC) converter followed by a resonant converter stage for DC voltage regulation. Usually, the PFC stage is hard switched and operated at a lower switching frequency while the resonant stage is soft switched with a high switching frequency. The resonant stage is usually made of a primary side switch network, a resonant network including a transformer and a secondary side switch network which interfaces to the DC load. The secondary switch network is generally made of diodes in unidirectional converters and MOSFETs in bidirectional converters. If the PFC stage and the primary side switch network are merged into a single switch network, there is a possibility of reducing the number of required semiconductors. Moreover, modifications of the traditional designs may permit the semiconductor switches to operate in mostly soft switching mode, resulting in an increased switching frequency operation vis-à-vis hard switched PFC. Since the two converter stages are not completely decoupled, the DC link capacitor value can be smaller.

Multilevel PFC converters offer several advantages when compared to its two-level counterpart such as scalability to higher AC voltages, improved power quality and reduced filter size. Consider a traditional 3-level converter arm as shown in FIG. 1. It interfaces the DC link with one AC port (zO) which is connected to utility AC.

As shown in FIG. 1, 8 active switches (MOSFETs) and 4 passive switches (Diodes) are required. Also shown are bypass catch diodes on each active switch to reduce strain on the intrinsic diode of the MOSFETs.

In this design, the central node marked 0 is ground, while X is the nominal input and Z is the nominal output; however, because the configuration is symmetric, the roles may be reversed, and the converter is bidirectional. The input side switches are operated to synchronously rectify the incoming power, producing a rectified DC voltage between top and bottom, which is filtered by the two capacitors. The output side switches are then operated to modulate the rectified DC voltage to produce a power output.

In a three-phase design, the triphasic waveform permits use of 12 active switches, one capacitor, and eliminates need for passive switches, as shown in in FIG. 2.

A variety of converters have been proposed covering different aspects (6-9). In a conventional three-phase interleaved full-bridge output rectifier configuration as shown in FIG. 2, 12 switches are required in the input stage (4-5). In these designs, the input power is first synchronously rectified using a three-phase interleaved full-bridge (two switches per phase) configuration, and then the rectified DC voltage is modulated as a high frequency AC intermediate signal, using an interleaved full-bridge (two switches per phase), resulting in a requirement for twelve switches in the front end, half are hard-switched, operating at a limited switching frequency, and half are soft switched operating at much higher switching frequency.

Hard switching occurs when there is an overlap between voltage and current when switching the transistor on and off. This overlap causes energy losses which can be minimized by increasing the di/dt and dv/dt. However, higher di/dt or dv/dt causes EMI to be generated. Therefore, the di/dt and dv/dt should be optimized to avoid EMI issues. To minimize the EMI effects and to improve efficiency, an improved hard switching technique called quasi-resonant switching was developed (mainly seen in flyback converters). In this mode, the transistor is turned on when the voltage across the drain and source is at a minimum (in a valley) in order to minimize the switching losses and to improve efficiency. Switching the transistor when the voltage is at a minimum helps reduce the hard switching effect which causes EMI. Switching when a valley is detected, rather than at a fixed frequency, introduces frequency jitter. This has the benefit of spreading the RF emissions and reducing EMI overall.

Soft switching begins when one electrical parameter reaches zero (current or voltage) before the switch is turned on or off. This has benefits in terms of losses. Also, since the switching loss per transition decreases, the semiconductors can be switched at higher frequency reducing the size of converter. The smooth resonant switching waveforms also minimize EMI. Common topologies like phase-shifted zero voltage switching (ZVS) and two inductors and a capacitor (LLC) are soft switched only at turn-on. For ZVS, the transistor will be turned on at zero VDS voltage to reduce the turn-on switching loss. For zero current switching (ZCS), the transistor will be turned off at zero $I_D$ current to reduce the turn off switching loss.

Most resonant circuits are half- or full-bridge topologies (two or four transistors). As transistors are switched on and off, energy can be left in the transistor and this can cause failure. Due to switching times, if this only happens occasionally a rugged body diode is sufficient. If due to fast transition times it happens continually, then a fast body diode is required to make sure all the energy will leave the transistor.

A nine-switch power converter design is known (12), as shown in FIG. 3.

This design is a reduced switch topology of conventional twelve-switch back-to-back converter. It has three legs with three switches in each of the leg compared to six legs with two switches in each leg of the conventional twelve-switch converter. The top switches in each leg along with corresponding middle switches work as the rectifier and the bottom switches along with the middle switches work as the inverter. Hence the middle switches are shared by both rectifier and inverter, reducing the switch count by 25%. This converter can operate in both constant frequency mode, where the output frequency is same as the input utility frequency and the variable frequency mode, where the output frequency is adjustable.

REFERENCES (Each of the following is expressly incorporated herein by reference in its entirety)

J. Lai, L. Zhang, Z. Zahid, N. Tseng, C. Lee and C. Lin, "A high-efficiency 3.3-kW bidirectional on-board charger," 2015 *IEEE 2nd International Future Energy Electronics Conference (IFEEC)*, Taipei, 2015, pp. 1-5.

D. Gautam, F. Musavi, M. Edington, W. Eberle and W. G. Dunford, "An automotive on-board 3.3 kW battery charger for PHEV application," 2011 *IEEE Vehicle Power and Propulsion Conference*, Chicago, Ill., 2011, pp. 1-6.

H. Kim, M. Ryu, J. Baek and J. Jung, "High-Efficiency Isolated Bidirectional AC-DC Converter for a DC Distribution System," in *IEEE Transactions on Power Electronics*, vol. 28, no. 4, pp. 1642-1654, April 2013.

B. Li, Q. Li, F. C. Lee, Z. Liu and Y. Yang, "A High-Efficiency High-Density Wide-Bandgap Device-Based Bidirectional On-Board Charger," in *IEEE Journal of Emerging and Selected Topics in Power Electronics*, vol. 6, no. 3, pp. 1627-1636, September 2018.

R. Gadelrab, Y. Yang, B. Li, F. Lee and Q. Li, "High-Frequency High-Density Bidirectional EV Charger," 2018 *IEEE Transportation Electrification Conference and Expo (ITEC)*, Long Beach, Calif., 2018, pp. 687-694.

Guanghai Gong, M. L. Heldwein, U. Drofenik, J. Minibock, K. Mino and J. W. Kolar, "Comparative evaluation of three-phase high-power-factor AC-DC converter concepts for application in future More Electric Aircraft," in *IEEE Transactions on Industrial Electronics*, vol. 52, no. 3, pp. 727-737, June 2005.

Mallik and A. Khaligh, "Intermediate DC-Link Capacitor Reduction in a Two-Stage Cascaded AC/DC Converter for More Electric Aircrafts," in *IEEE Transactions on Vehicular Technology*, vol. 67, no. 2, pp. 935-947, February 2018.

K. Ali, R. K. Surapaneni, P. Das and S. K. Panda, "An SiC-MOSFET-Based Nine-Switch Single-Stage Three-Phase AC-DC Isolated Converter," in *IEEE Transactions on Industrial Electronics*, vol. 64, no. 11, pp. 9083-9093, November 2017.

L. Zhang, P. C. Loh and F. Gao, "An Integrated Nine-Switch Power Conditioner for Power Quality Enhancement and Voltage Sag Mitigation," in *IEEE Transactions on Power Electronics*, vol. 27, no. 3, pp. 1177-1190, March 2012.

H. Zhou and A. M. Khambadkone, "Hybrid Modulation for Dual-Active-Bridge Bidirectional Converter With Extended Power Range for Ultracapacitor Application," in *IEEE Transactions on Industry Applications*, vol. 45, no. 4, pp. 1434-1442, July-August 2009.

J. Everts, F. Krismer, J. Van den Keybus, J. Driesen and J. W. Kolar, "Optimal ZVS Modulation of Single-Phase Single-Stage Bidirectional DAB AC-DC Converters," in *IEEE Transactions on Power Electronics*, vol. 29, no. 8, pp. 3954-3970, August 2014.

C. Liu, B. Wu, N. R. Zargari, D. Xu and J. Wang, "A Novel Three-Phase Three-Leg AC/AC Converter Using Nine IGBTs," in *IEEE Transactions on Power Electronics*, vol. 24, no. 5, pp. 1151-1160, May 2009.

Ding, T.; Kou, Y.; Yang, Y.; Zhang, Y.; Yan, H.; Blaabjerg, F. Evaluating maximum photovoltaic integration in district distribution systems considering optimal inverter dispatch and cloud shading conditions. IET Renew. Power Gener. 2017, 11, 165-172.

Blaabjerg, F.; Ma, K. Wind Energy Systems. Proc. IEEE 2017, 105, 2116-2131.

Bose, B. K. Power Electronics, Smart Grid, and Renewable Energy Systems. Proc. IEEE 2017, 105, 2011-2018.

Popavath, L. N.; Kaliannan, P. Photovoltaic-STATCOM with Low Voltage Ride through Strategy and Power Quality Enhancement in a Grid Integrated Wind-PV System. Electronics 2018, 7, 51.

Blaabjerg, F.; Yang, Y.; Yang, D.; Wang, X. Distributed Power-Generation Systems and Protection. Proc. IEEE 2017, 105, 1311-1331.

Arya, S. R.; Singh, B.; Niwas, R.; Chandra, A.; Al-Haddad, K. Power Quality Enhancement Using DSTATCOM in Distributed Power Generation System. IEEE Trans. Ind. Appl. 2016, 52, 5203-5212.

Sekhar, V. C.; Kant, K.; Singh, B. DSTATCOM supported induction generator for improving power quality. IET Renew. Power Gener. 2016, 10, 495-503.

Liu, C.; Wu, B.; Zargari, N. R.; Xu, D.; Wang, J. A Novel Three-Phase Three-Leg AC/AC Converter Using Nine IGBTs. IEEE Trans. Power Electron. 2009, 24, 1151-1160.

Liu, X.; Wang, P.; Loh, P. C.; Blaabjerg, F. A Compact Three-Phase Single-Input/Dual-Output Matrix Converter. IEEE Trans. Ind. Electron. 2012, 59, 6-16.

Liu, X.; Loh, P. C.; Wang, P.; Blaabjerg, F. A Direct Power Conversion Topology for Grid Integration of Hybrid AC/DC Energy Resources. IEEE Trans. Ind. Electron. 2013, 60, 5696-5707.

Diab, M. S.; Elserougi, A. A.; Abdel-Khalik, A. S.; Massoud, A. M.; Ahmed, S. A Nine-Switch-Converter-Based Integrated Motor Drive and Battery Charger System for EVs Using Symmetrical Six-Phase Machines. IEEE Trans. Ind. Electron. 2016, 63, 5326-5335.

Dehghan, S. M.; Mohamadian, M.; Yazdian, A. Hybrid Electric Vehicle Based on Bidirectional Z-Source Nine-Switch Inverter. IEEE Trans. Veh. Technol. 2010, 59, 2641-2653.

Liu, C.; Wu, B.; Zargari, N.; Xu, D. A novel nine-switch PWM rectifier-inverter topology for three-phase UPS applications. In Proceedings of the 2007 European Conference on Power Electronics and Applications, Aalborg, Denmark, 2-5 Sep. 2007; pp. 1-10.

Loh, P. C.; Zhang, L.; Gao, F. Compact Integrated Energy Systems for Distributed Generation. IEEE Trans. Ind. Electron. 2013, 60, 1492-1502.

Qin, Z.; Loh, P. C.; Blaabjerg, F. Application Criteria for Nine-Switch Power Conversion Systems with Improved Thermal Performance. IEEE Trans. Power Electron. 2015, 30, 4608-4620.

Ali, K.; Das, P.; Panda, S. K. A Special Application Criterion of Nine-Switch Converter with Reduced Conduction Loss. IEEE Trans. Ind. Electron. 2017, 64, 2853-2862.

Rahman, K.; Al-Emadi, N.; Iqbal, A.; Rahman, S. Common mode voltage reduction technique in a three-to-three phase indirect matrix converter. IET Electr. Power Appl. 2018, 12, 254-263.

Park, K.; Lee, K. B.; Blaabjerg, F. Improving Output Performance of a Z-Source Sparse Matrix Converter Under Unbalanced Input-Voltage Conditions. IEEE Trans. Power Electron. 2012, 27, 2043-2054.

Shi, T.; Zhang, X.; An, S.; Yan, Y.; Xia, C. Harmonic suppression modulation strategy for ultra-sparse matrix converter. IET Power Electron. 2016, 9, 589-599.

Ledezma, E.; McGrath, B.; Munoz, A.; Lipo, T. A. Dual AC-drive system with a reduced switch count. IEEE Trans. Ind. Appl. 2001, 37, 1325-1333.

Blaabjerg, F.; Freysson, S.; Hansen, H. H.; Hansen, S. A new optimized space-vector modulation strategy for a component-minimized voltage source inverter. IEEE Trans. Power Electron. 1997, 12, 704-714.

da Silva, C. H.; Pereira, R. R.; da Silva, L. E. B.; Lambert-Torres, G.; Bose, B. K.; Ahn, S. U. A Digital PLL Scheme for Three-Phase System Using Modified Synchronous Reference Frame. IEEE Trans. Ind. Electron. 2010, 57, 3814-3821.

Sakakibara, U.S. US20180062542A1

See also: 20200313572; 20200313539; 20200295668; 20200295587; 20200295558; 20200280202; 20200274375; 20200271700; 20200235672; 20200228082; 20200228010; 20200195121; 20200186021; 20200169180; 20200169087; 20200161980; 20200161962; 20200161145; 20200156491; 20200153345; 20200136574; 20200136517; 20200119653; 20200106365; 20200099330; 20200099311; 20200099288; 20200093039; 20200091813; 20200068713; 20200059151; 20200059104; 20200052587; 20200044562; 20200041356; 20200027839; 20200021205; 20200021199; 20200013705; 20200008277; 20200006948; 20200002828; 20190393792; 20190386579; 20190381890; 20190375350; 20190372536; 20190372449; 20190351770; 20190341810; 20190341797; 20190335552; 20190327818; 20190326813; 20190326811; 20190313531; 20190305664; 20190297784; 20190288604; 20190267365; 20190260303; 20190260283; 20190260282; 20190252989; 20190229618; 20190229609; 20190222127; 20190222126; 20190214956; 20190214951; 20190214947; 20190199228; 20190190398; 20190165573; 20190149055; 20190146014; 20190140639; 20190140606; 20190140485; 20190123661; 20190117919; 20190115845; 20190110343; 20190109533; 20190109530; 20190097530; 20190097452; 20190089258; 20190087357; 20190074774; 20190068074; 20190058345; 20190052179; 20190044448; 20190036459; 20190036447; 20190036442; 20190036366; 20190020269; 20190013683; 20190008022; 20180367050; 20180358902; 20180356791; 20180352622; 20180351463; 20180351343; 20180342956; 20180337537; 20180331632; 20180331553; 20180323616; 20180309372; 20180302006; 20180297477; 20180287490; 20180278181; 20180278167; 20180270985; 20180270944; 20180269797; 20180262101; 20180261681; 20180253117; 20180248475; 20180241315; 20180241299; 20180231194; 20180229968; 20180226893; 20180226797; 20180219399; 20180212525; 20180205315; 20180205252; 20180183323; 20180183321; 20180175741; 20180175673; 20180175657; 20180175348; 20180166997; 20180159459; 20180152042; 20180145621; 20180145592; 20180138827; 20180138714; 20180131222; 20180131213; 20180109175; 20180102713; 20180102710; 20180102644; 20180091041; 20180090441; 20180083546; 20180083542; 20180076731; 20180069486; 20180069424; 20180063907; 20180054125; 20180054118; 20180048225; 20180027630; 20180026528; 20180019655; 20180017613; 20170373602; 20170358992; 20170358989; 20170346386; 20170338690; 20170331371; 20170310225; 20170310164; 20170303353; 20170302151; 20170295634; 20170294840; 20170294808; 20170290114; 20170288557; 20170288411; 20170279367; 20170264122; 20170257033; 20170257022; 20170251534; 20170250618; 20170244316; 20170244248; 20170237349; 20170237339; 20170231051; 20170229972; 20170222643; 20170222561; 20170207707; 20170201113; 20170196118; 20170194871; 20170170718; 20170164436; 20170163163; 20170162488; 20170155340; 20170149340; 20170135171; 20170133922; 20170126133; 20170117815; 20170113567; 20170104426; 20170099710; 20170099011; 20170098967; 20170098956; 20170093282; 20170093201; 20170085183; 20170079095; 20170077818; 20170063220; 20170063081; 20170053904; 20170040903; 20170034958; 20170033701; 20170033698; 20170027023; 20170025970; 20170025950; 20170025885; 20170019095; 20160380547; 20160380455; 20160380447; 20160373027; 20160373012; 20160372957; 20160365801; 20160365798; 20160365794; 20160351559; 20160344290; 20160344280; 20160334822; 20160329830; 20160322968; 20160322828; 20160314230; 20160308451; 20160308383; 20160308356; 20160307690; 20160301326; 20160301314; 20160294298; 20160294294; 20160294291; 20160294275; 20160294227; 20160291682; 20160285357; 20160270168; 20160268917; 20160268916; 20160268909; 20160254757; 20160249919; 20160249918; 20160249917; 20160249916; 20160249915; 20160249910; 20160249909; 20160249908; 20160245855; 20160242308; 20160241087; 20160233774; 20160226385; 20160218528; 20160218516; 20160205735; 20160190954; 20160190909; 20160190946; 20160190943; 20160181944; 20160181933; 20160181927; 20160181920; 20160172877; 20160172310; 20160165688; 20160149501; 20160149177; U.S. Pat. Nos. 10,784,707; 10,778,025; 10,770,977; 10,770,976; 10,770,975; 10,748,697; 10,720,787; 10,700,589; 10,666,156; 10,651,748; 10,644,586; 10,644,503; 10,637,360; 10,630,197; 10,608,607; 10,594,207; 10,581,336; 10,581,318; 10,574,148; 10,554,141; 10,554,134; 10,536,073; 10,516,373; 10,498,226; 10,498,225; 10,476,372; 10,447,148; 10,443,139; 10,439,392; 10,404,218; 10,396,671; 10,396,599; 10,374,517; 10,374,507; 10,367,413; 10,362,652; 10,361,632; 10,340,807; 10,326,357; 10,326,309; 10,320,298; 10,320,283; 10,284,100; 10,284,097; 10,284,077; 10,283,454; 10,270,439; 10,256,741; 10,250,249; 10,250,151; 10,250,149; 10,218,256; 10,205,400; 10,205,380; 10,193,442; 10,186,976; 10,170,974; 10,153,712; 10,128,763; 10,128,689; 10,116,219; 10,110,075; 10,103,644; 10,079,544; 10,079,543; 10,075,095; 10,075,058; 10,027,237; 10,008,947; 10,003,279; 9,998,018; 9,991,799; 9,973,107; 9,960,698; 9,960,696; 9,960,686; 9,923,448; 9,917,524; 9,917,515; 9,912,241; 9,906,147; 9,899,882; 9,894,718; 9,893,636; 9,893,609; 9,876,435; 9,871,182; 9,866,139; 9,866,108; 9,847,732; 9,837,920; 9,837,913; 9,825,545; 9,821,670; 9,814,154; 9,812,977; 9,807,830; 9,793,813; 9,787,200; 9,783, 900; 9,774,271; 9,774,270; 9,774,268; 9,769,896; 9,768,700; 9,763,289; 9,762,115; 9,761,370; 9,755,541; 9,742,288; 9,735,676; 9,735,671; 9,729,064; 9,723,667; 9,722,599; 9,712,045; 9,698,768; 9,693,411; 9,685,795; 9,673,719; 9,668,309; 9,667,171; 9,665,672; 9,648,678; 9,647,562; 9,629,209; 9,614,453; 9,608,532; 9,608,462; 9,602,018; 9,595,877; 9,590,513; 9,590,492; 9,583,073; 9,578,692; 9,559,553; 9,548,668; 9,548,619; 9,531,294; 9,531,282; 9,531,279; 9,515,562; 9,502,987; 9,490,694; 9,490,653; 9,484,822; 9,484,821; 9,479,073; 9,479,067; 9,479,048; 9,473,045; 9,467,057; 9,467,054; 9,461,554; 9,461,552; 9,455,620; 9,444,353; 9,444,346; 9,438,129; 9,436,198; 9,420,670; 9,419,514; 9,407,154; 9,401,653; 9,391,524; 9,374,011; 9,350,260; 9,344,042; 9,338,853; 9,337,743; 9,331,004; 9,320,131; 9,318,968; 9,312,777; 9,312,750; 9,307,623; 9,281,752; 9,276,479; 9,275,946; 9,271,349; 9,269,489; 9,257,917; 9,240,726; 9,237,636; 9,219,378; 9,210,749; 9,203,365; 9,203,321; 9,190,911; 9,179,504; 9,178,440; 9,178,438; 9,166,575; 9,166,488; 9,154,041; 9,148,048; 9,143,044; 9,143,040; 9,136,734; 9,123,467; 9,118,250; 9,112,428; 9,083,204; 9,077,255; 9,077,245; 9,065,343; 9,059,636; 9,054,585; 9,048,696; 9,035,501; 9,035,435; 9,030,852; 9,001,539; 8,976,561; 8,953,341; 8,908,395; 8,908,393; 8,861,238; 8,767,421; 8,711,593; 8,698,462; 8,693,217; 8,638,042; 8,599,582; 8,519,693; 8,508,958; 8,503,195; 8,502,475; 8,502,420; 8,482,945; 8,482,213; 8,456,101; 8,441,203; 8,400,074; 8,385,088; 8,362,648; 8,339,056; 8,330,382; 8,324,829; 8,324,813; 8,319,447; 8,300,440; 8,300,431; 8,238,129; 8,199,537; 8,194,421; 8,159,839; 8,089,254; 8,084,887; 8,076,920; 7,995,359; 7,991,588; 7,986,535; 7,952,895; 7,893,561; 7,886,173; 7,852,644; 7,852,017; 7,830,130; 7,787,270; 7,786,709; 7,751,208; 7,746,677; 7,738,266; 7,724,555; 7,714,554; 7,706,161; 7,706,154; 7,706,152; 7,679,941; 7,613,016; 7,612,602; 7,598,792; 7,548,440; 7,518,886; 7,489,526; 7,463,499; 7,456,521; 7,161,816; 7,157,886; 7,145,786; 7,085,145; 7,079,403; 6,984,965; 6,980,441; 6,975,098; 6,952,355; 6,934,166; 6,930,893; 6,911,848; 6,898,092; 6,833,635; 6,812,679; 6,707,285; 6,700,804; 6,580,259; 6,567,281; 6,545,431; 6,507,501; 6,504,423; 6,493,242; 6,486,615; 6,445,600; 6,384,540; 6,344,985; 6,272,025; 6,034,489; 5,978,236; 5,936,855; 5,786,992; 5,668,707; 5,668,466; 5,663,635; 5,657,212; 5,633,791; 5,625,543; 5,587,892; 5,570,279; 5,483,127; 5,416,387; 5,406,192; 5,293,308; 5,289,361; 5,231,563; 5,225,789; and 4,709,323.

SUMMARY OF THE INVENTION

In a conventional two-stage AC-DC resonant converter, a three-phase active front-end (AFE) boost power factor correction (PFC) rectifier feeds an interleaved three-phase resonant converter, as discussed above. The resonant converter part contains a high frequency AC converter followed by a rectifier stage.

According to the present technology, a multilevel PFC converter is merged with the switch network of the resonant converter resulting in reduced number of semiconductor switches. The advantages include higher power density, higher efficiency and lower cost than the traditional designs.

A typical two-stage AC-DC converter consists of a PFC converter stage and a resonant converter stage. A PFC converter can be of two-level or of multi-level. Multilevel PFC converter offer several advantages when compared to its two-level counterpart such as scalability to higher AC voltages, improved power quality and reduced filter size.

The integrated front end reduces cost compared to conventional converters.

The interleaved modulation reduces the DC ripple and the filter size on the rectifier side, which results in reduction in size of the converter.

The architecture is useful for implementing a medium power AC to DC bidirectional converter for on board electrical vehicle (EV) Charging, energy storage applications, more electric aircraft, and medium voltage electrical drives, for example.

The technology provides superior performance and efficiency facilitated by feeding a bipolar voltage to resonant tank circuits. The high frequency intermediate power transfer helps achieve higher power density and efficiency, and lower cost. Further, the absence of a sustained DC voltage in resonant capacitors leads to stable operation and longer lifetime of the converter. The soft-switching of the semiconductor devices enables high switching frequency high efficiency operation.

It is therefore an object to provide a multilevel stage of a bidirectional AC power converter having at least three levels, comprising: a set of switches in series, comprising twice the number of switches as levels, i.e., two switches per level; a set of capacitors in series, having one less capacitor than the number of levels, the set of capacitors being in parallel with the set of switches; a number of sets of diodes in series corresponding to the number of levels minus two, each set of diodes defining a unidirectional current flow direction along the set of diodes; a center tap along the set of switches in series; and a pair of taps, respectively after the first and before the last switch of the set of switches in series; wherein each node between respective capacitors is connected to a single node between respective diodes of a respective set of diodes, each set of diodes connecting nodes between respective switches spaced by one less than the number of levels starting after the second switch and ending before the second to last switch, such that the number of switches and the number of diodes in parallel is the same, and the connection between the node between respective capacitors and the single node between respective diodes of a respective set of diodes is made such that the number of capacitors beneath the connection node is equal to the number of diodes beneath the connection node.

The center node may be connected to a phase of a multiphase power source, and/or a phase of a multiphase power sink.

The pair of taps may be connected to a synchronous rectifier or a resonant synchronous rectifier.

The multilevel stage of the bidirectional AC power converter wherein the pair of taps are connected to a second multilevel bidirectional power converter having at least three levels, comprising: a second set of switches in series, comprising twice the number of switches as levels; a second set of capacitors in series, having one less capacitor than the number of levels, the second set of capacitors being in parallel with the second set of switches; a number of second sets of diodes in series corresponding to the number of levels of the second multilevel bidirectional power converter minus two, each second set of diodes defining a unidirectional current flow direction along the second set of diodes; a second center tap along the second set of switches in series; and a second pair of taps, respectively after the first and before the last switch of the second set of switches in series; wherein each node between respective capacitors of the second set of capacitors is connected to a single node between respective diodes of a respective second set of diodes, each second set of diodes connecting nodes between respective switches spaced by one less than the number of levels of the second multilevel bidirectional power converter starting after the second switch and ending before the second to last switch of the second set of switches, such that the number of switches and the number of diodes in parallel is the same, and the connection between the node between respective capacitors of the second set of capacitors and the single node between respective diodes of a respective second set of diodes is made such that the number of capacitors beneath the connection node is equal to the number of diodes beneath the connection node.

The multilevel stage of a bidirectional AC power converter may further comprise a controller configured to control the first set of switches to convert an AC current into a DC voltage across the set of capacitors, and to generate an AC waveform at a different frequency from the AC waveform at the pair of taps.

The multilevel stage of a bidirectional AC power converter may further comprise a transformer and a resonant tank circuit; a synchronous bridge rectifier comprising a set of switches in series; and a controller configured to control the first set of switches and the set of switches in series to convert an AC current into a first DC voltage across the set of capacitors, and to generate a resonant AC waveform to transfer power through the transformer to the synchronous bridge rectifier, and to control the synchronous bridge rectifier to produce a second DC voltage.

Each of the switches may be a MOSFET switch, a MOSFET switch in parallel with a diode, or a SiC MOSFET with or without external diode.

The center tap may receive an AC waveform having a frequency between 50 and 60 Hz, between 30 and 400 Hz, an AC voltage between 50 and 500 VAC RMS, a voltage between 90 and 440 VAC RMS, for example.

The multilevel stage of a bidirectional AC power converter may be provided in multiple copies for each respective phase (e.g., three copies for three phases), each receiving a respective phase of a three phase AC system operating between 120-240 VAC, e.g., a three phase AC system operating at 240 VAC between 50-60 Hz.

The pair of taps may interface with a tank circuit having a resonant frequency between 2 kHz-1 MHz. The pair of taps may generate a waveform having a frequency >10 kHz, >25 kHz, >50 kHz, >75 kHz, >100 kHz, >150 kHz, >250 kHz, >500 kHz, >1 MHz, or 50-150 kHz, for example. The pair of taps may feed a tank circuit comprising a capacitor and an inductor.

The multilevel stage of a bidirectional AC power converter may further comprise an automated controller, configured to control the set of switches. The automated controller may be configured to perform power factor correction. The automated controller may be configured to sequence a startup of the set of switches, and after startup, generate a different switching pattern.

Power may be transferred through the pair of taps to charge a battery, and/or power may be transferred through the pair of taps from the battery.

Power transferred through the pair of taps may be supplied to run a motor. Power transferred through the center tap may be received from a generator and or supplied to drive a motor. Power transferred through the center tap may be used to drive a motor-generator and to provide regenerative braking from the motor generator.

The set of switches may be controlled to produce a dynamic waveform at the pair of taps distinct from a waveform received at the center tap.

It is also an object to provide a multilevel stage of a bidirectional AC power converter having a number of levels N, wherein N is at least 3, comprising: a set of switches in series, comprising (N×2) switches, having a center tap and a pair of taps before the first and last switches; (N−2) sets of (N−1) diodes in series; and (N−1) capacitors in series, the (N−1) capacitors in series being in parallel to the set of switches in series, wherein the switches, diodes and capacitors being configured to generate, from a first AC waveform at the center tap and a controlled sequence of switching signals, a DC voltage across the set of switches in series, with nodes between respective capacitors being connected to nodes between respective diodes, and further to generate from the DC voltage across the set of switches in series and the controlled sequence of switching signals, a second AC waveform from the pair of taps.

It is a further object to provide a power converter, comprising: a front-end interfacing with a multi-phase AC system, comprising, for each respective phase: a set of switches in series, comprising at least six switches in series; a series of capacitors in parallel with each of the sets of switches in series; at least one set of diodes in series coupling nodes between capacitors and nodes between switches; the set of switches, set of capacitors and sets of diodes forming a multilevel converter; a resonant tank circuit, connected between two of the set of switches in series; a synchronous converter, configured to interface with a secondary power system; and a coupling transformer, configured to couple power from the resonant tank circuit for each respective phase to the synchronous converter; and a controller, configured to control the switches and the synchronous converter, to transfer power from the multiphase AC system to a load on the synchronous converter.

A still further object provides a method of power conversion, comprising: providing a multilevel power converter; and automatically controlling the set of and the synchronous converter, to transfer the power from the multiphase AC system to the load on the synchronous converter. The set of and the synchronous converter may be automatically controlled to transfer the power from the synchronous converter to the multiphase AC system.

A typical design with 240 VAC 60 Hz power may be implemented using 900V or 1200V rated, SiC MOSFETs. These switches permit achievement of high power density, high efficiency and provide on-board galvanic isolation. The integrated front end reduces cost compared to conventional converters.

The circuits also do a good job of blocking the injection of high frequency noise back onto the power grid (low total harmonic distortion (THD); high quality power), and reducing output ripple by doing phase balancing according to load using interleaved operation.

In accordance with one aspect of the invention, an integrated three phase bidirectional AC to DC converter is provided that interfaces the power grid with a battery system, and permits battery charging from the grid, and powering of the grid from the stored energy.

In one embodiment, the present invention provides a six-switch multilevel front-end converter for each phase. The six switches are in series, with two diodes and two capacitors completing the circuit.

One set of terminals of the six-switch front-end converter (e.g., the respective nodes below the high switch) is connected to the grid, whereas the other set of terminals (e.g., the respective nodes above the low switch and below the high switch) are connected through an L-C resonant tank to the primary side of a High Frequency (HF) transformer, that provides galvanic isolation for the converter system. Since the design is bidirectional, power may flow from the first set of terminals to the second set of terminals, or from the second set of terminals to the first set of terminals.

The output side converter need not be a simple AC to DC rectifier, and may produce arbitrary output waveforms depending on how the switches are driven, and availability of additional components.

This converter structure (with proper design of resonant elements and modulation techniques) provides soft switching. This allows operation of the converter with a much higher frequency than the typical operating frequency for a conventional converter. In effect, this brings about a compact and light-weight converter system.

An automated controller may be provided, configured to control the six-switch front-end and the synchronous converter.

The automated controller may be configured to perform power factor correction, sequence a startup of the bidirectional AC power converter, and/or balance a phase load on the three phase AC system.

The secondary load may be a battery, and the bidirectional AC power converter may be configured to charge the battery from the three phase AC system in a first mode of operation, and to power the three phase AC system from the battery in a second mode of operation.

The coupling transformer may comprise a separate primary coil and secondary coil for each respective phase of the three phase AC system. The coupling transformer may provide galvanic isolation between the three phase AC system and the secondary load. The coupling transformer may be coupled to the synchronous converter with a respective second tank circuit for each respective phase.

The synchronous converter may be controlled to produce a dynamic waveform at the secondary load distinct from a waveform of the bidirectionally coupled AC electrical power at the switching frequency.

A filter capacitor may be provided across the DC potential and/or the secondary load.

A magnetizing inductance ($L_m$) of the coupling transformer, and the tank circuit may be together configured to maintain zero voltage switching (ZVS) of the front-end switches at a load condition, e.g., load conditions comprising a factor of two or four.

The bidirectional AC power converter may comprise an automated controller, configured to control the six-switch front end in a startup mode to: charge the capacitors with a desired DC potential in a rectifier mode of operation; and after charging the capacitors, initiate operation of the tank circuits by switching at a switching frequency of about double the resonant frequency, and subsequently reduce the frequency of operation until a desired output is achieved at the secondary load. The automated controller may control the six-switch front end in a low-power mode below 20% of rated output, to operate the set of three tank circuits in a burst mode of operation wherein the switches are alternately turned on and off for intervals of several switching cycles. The automated controller may control the six-switch front end in a high-power mode above 20% of rated output, to operate the set of three tank circuits in a continuous mode of operation wherein the switches are operated regularly for each switching cycle. The automated controller may regulate output power by a phase shift control of the six-switch front-end and the synchronous converter.

The power converter may further comprise an automated control, configured to: control the front-end to synchronously convert electrical power between the multi-phase AC system and a DC potential on the capacitor, and convert the DC potential on the capacitor into a switched frequency which passes through the resonant tank circuits.

Each resonant tank circuit may comprise a capacitor and an inductor. The resonant frequency of the resonant tank circuits may be higher than an operating frequency of the multi-phase AC system.

An automated controller may control the power converter to perform power factor correction, sequence a startup of the power converter, balance a phase load on the multi-phase AC system, and/or regulate output power by a phase shift control of the sets of switches in series and the synchronous converter.

The secondary power system may comprise a battery, and the power converter may be configured to charge the battery from the multi-phase AC system in a first mode of operation, and to power the multi-phase AC system from the battery in a second mode of operation.

It is another object to provide a method of power conversion, comprising: providing a power converter, comprising a front-end interfacing with a multi-phase AC system, comprising, for each respective phase, a set of six switches in series, a pair of capacitors in series across the DC rails, a pair of diodes, a resonant tank circuit for each respective phase, connected between two of the set of six switches in series for a respective phase, a synchronous converter, configured to interface with a secondary power system, and a coupling transformer, configured to couple power from the resonant tank circuit for each respective phase to the synchronous converter; and automatically controlling the set of six switches in series and the synchronous converter, to control the front-end to synchronously convert electrical power between the multi-phase AC system and a DC potential on the series capacitors, and convert the DC potential on the capacitors into a switched frequency which passes through each respective resonant tank circuit. The synchronous converter may be controlled to operate at a switching frequency different from a resonant frequency of the resonant tank circuit. A resonant frequency of the resonant tank circuits may be higher than an operating frequency of the multi-phase AC system.

The circuits for each phase of the three-phase input are isolated, and therefore may be controlled independently.

It is a further object to provide a multilevel stage of an AC power converter having at least three levels, comprising: a set of switches in series, comprising two switches per level; a set of capacitors in series, having one less capacitor than the number of levels, the set of capacitors being in parallel with the set of switches; a clamping network interconnecting nodes of the set of switches with nodes of the set of capacitors, to establish incremental voltages across the set of capacitors; a center tap along the set of switches in series; and a pair of taps, respectively after the first and before the last switch of the set of switches in series; wherein the set of switches are operable to transfer power between the center tap operating at a first AC frequency and the pair of taps operating at a second AC frequency.

The clamping network may comprise a number of sets of diodes in series corresponding to the number of levels minus 2, defining a unidirectional current flow direction along the respective set of diodes, nodes between respective capacitors are connected to a single node between respective diodes of a respective set of diodes, each set of diodes connecting nodes between respective switches spaced by one less than the number of levels starting after the second switch and ending before the second to last switch, such that the number of switches and the number of diodes in parallel is the same, and the connection between the node between respective capacitors and the single node between respective diodes of a respective set of diodes is made such that the number of capacitors beneath the connection node is equal to the number of diodes beneath the connection node.

It is a further object to provide an AC power converter having a number of levels N, wherein N is at least 3, comprising: a set of switches in series, comprising (N×2) switches, having a center tap and a pair of taps after the first and before the last switches; (N−1) capacitors in series, the (N−1) capacitors in series being in parallel with the set of switches in series; and a clamping network communicating with nodes between the set of switches, configured to establish monotonically increasing voltages at sequential nodes between the capacitors in series, wherein the switches, clamping network and capacitors are configured to generate, from a first AC waveform at the center tap and a controlled sequence of switching signals, a DC voltage across the capacitors in series, and a second AC waveform from the pair of taps.

The clamping network may comprise (N−2) sets of diodes, wherein nodes between respective capacitors are connected to nodes between respective diodes, each set of diodes bridging a respective node between respective switches spaced by one less than the number of levels starting after the second switch and ending before the second to last switch.

The AC power converter may further comprise a resonant tank circuit, connected between two of the set of switches in series; a synchronous converter, configured to interface with a secondary power system; a coupling transformer, configured to couple power from the resonant tank circuit for each respective phase of a multi-phase AC system to the synchronous converter; and a controller, configured to control the set of switches and the synchronous converter, to transfer power from the multiphase AC system to a load on the synchronous converter.

It is also an object to provide a method of power conversion, comprising: providing a multilevel stage of an AC power converter having at least three levels, comprising: a set of switches in series, comprising two switches per level, having a center tap and a pair of taps before the first and last switches; a set of capacitors in series, the set of capacitors in series being in parallel with the set of switches in series; a clamping network, interconnecting nodes between switches of the set of switches and nodes between capacitors of the set of capacitors, configured to establish different operating voltages at nodes between the set of capacitors; interfacing the center tap with a first AC system; interfacing the pair of taps with a second AC system, wherein an AC waveform of the first system is different from an AC waveform of the second AC system; and automatically controlling a sequence of switching signals for the set of switches to generate a DC voltage across the set of switches in series and the capacitors in series, and to transfer power between the first AC system and the second AC system.

The clamping network may comprise sets of diodes which transfer a unidirectional current from a node between switches to a node between capacitors, each set of diodes connecting nodes between respective switches spaced by one less than the number of levels starting after the second switch and ending before the second to last switch, to establish a voltage gradient on the successive nodes of the set of capacitors.

The method may further comprise providing a synchronous converter as the second AC system, the synchronous converter receiving power from the pair of taps and driving a load; and automatically controlling the synchronous converter, to transfer the power from the pair of taps through the synchronous converter to the load.

The center node may be connected to a phase of a multiphase power source and/or power sink.

The pair of taps may be connected to a resonant synchronous rectifier.

The pair of taps may also be connected to a second multilevel power converter having at least three levels, comprising: a second set of switches in series, comprising twice the number of switches as levels; a second set of capacitors in series, having one less capacitor than the number of levels, the second set of capacitors being in parallel with the second set of switches; second clamping network interconnecting nodes of the second set of switches with nodes of the second set of capacitors, to establish incremental voltages across the second set of capacitors; a second center tap along the second set of switches in series; and a second pair of taps, respectively after the first and before the last switch of the second set of switches in series.

The system may further comprise a controller configured to control the first set of switches to interface an AC voltage having a first waveform at the center tap with a DC voltage across the set of capacitors, and to interface the DC voltage across the set of capacitors with an AC voltage having a second AC waveform at the pair of taps, the first waveform and the second waveform being different.

The system may further comprise a transformer and a resonant tank circuit; a synchronous bridge rectifier comprising a set of switches in series; and a controller configured to: control the first set of switches and the set of switches to convert an AC current into a first DC voltage across the set of capacitors, control the first set of switches to generate a resonant AC waveform to transfer power through the transformer to the synchronous bridge rectifier, and control the synchronous bridge rectifier to produce a second DC voltage.

The system may be configured to operate with a phase of an AC voltage signal between 50 and 500 VAC RMS applied to the center tap.

The system may further comprise a tank circuit comprising a capacitor and an inductor and having a resonant frequency between 2 kHz-1 MHz, which interfaces with the pair of taps.

The system may further comprise a resonant tank circuit, connected to a node between two of the set of switches in series; a synchronous converter, configured to interface with a secondary power system; a coupling transformer, configured to couple power from the resonant tank circuit to the synchronous converter; and a controller, configured to control the switches and the synchronous converter, to transfer power from a multiphase AC system supplying power to the AC power converter to a load on the synchronous converter.

The multiphase AC system supplying power to the AC power converter may operate at a frequency of 50 to 400 Hz and the controller may be configured to control the switches to generate a waveform having a frequency >10 kHz at the pair of taps, e.g., at frequencies of 1 MHz or greater.

An automated controller may be provided, configured to: control the set of switches in a startup sequence to charge the set of capacitors, and after the capacitors are charged, to control the set of switches in an operating sequence different from the startup sequence; and/or to perform power factor correction.

Power transferred through the pair of taps may interface with at least one of a rechargeable battery, a motor, a generator, and a motor-generator. Power transfer may be unidirectional or bidirectional.

DETAILED DESCRIPTION OF THE PREFERRED EMBODIMENTS

Figure 2:
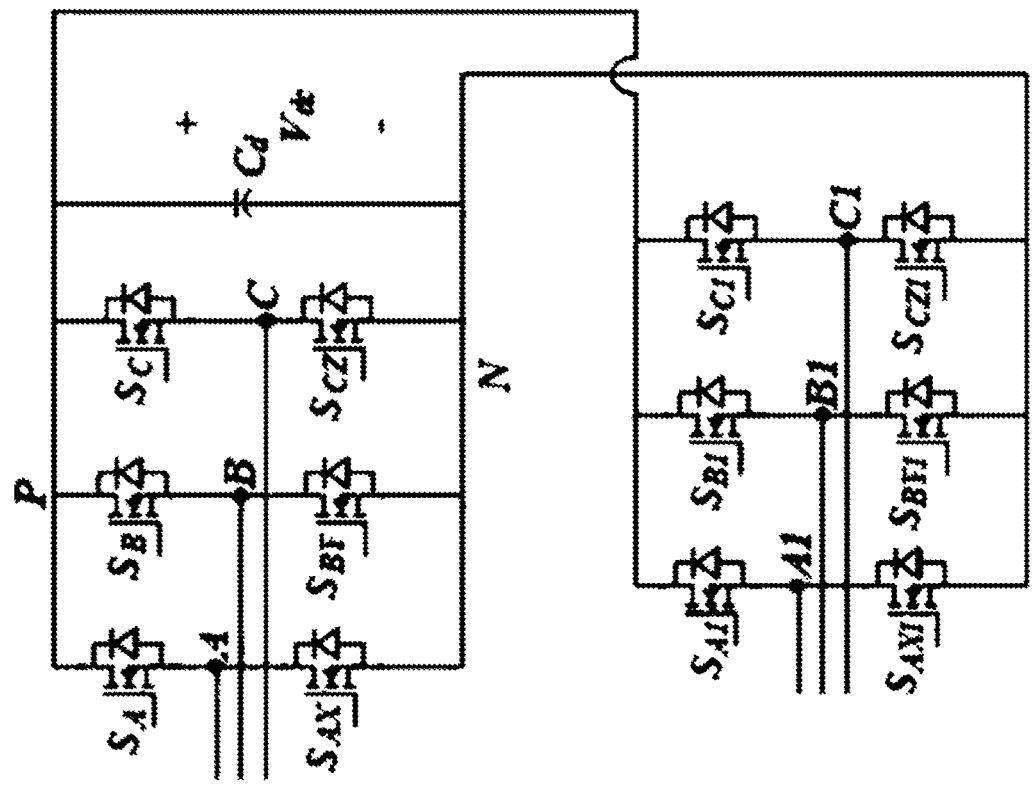
FIG. 2 shows a prior art three-phase converter design, with 12 active switches, and one capacitor.
Figure 1:
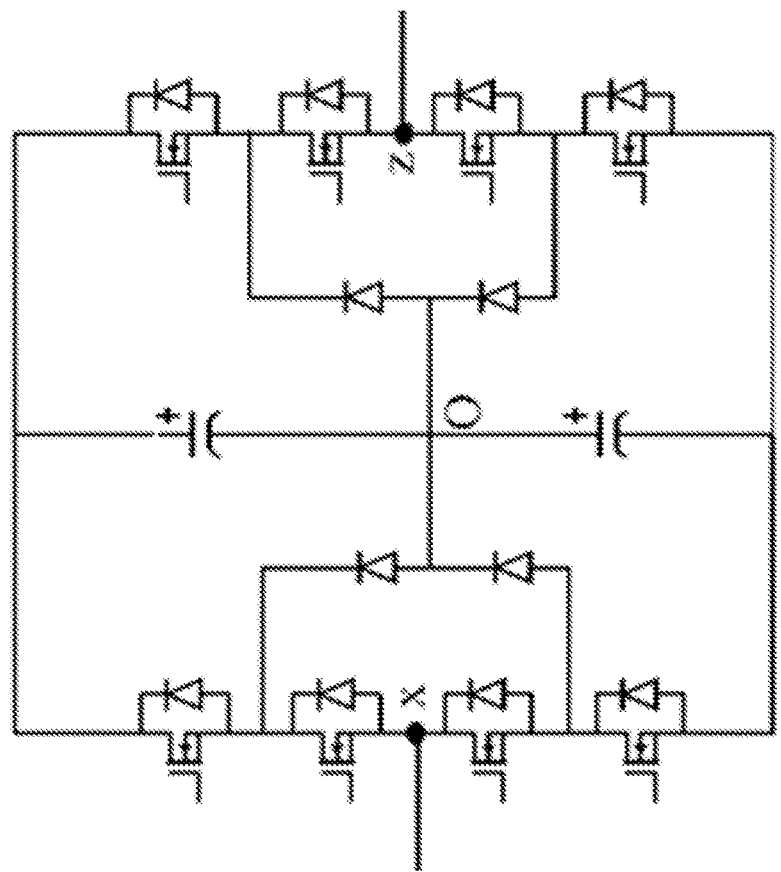
FIG. 1 shows a prior art two-level converter first stage.

A prior art two stage AC-DC converter according to the present invention with 3-level PFC is shown in FIG. 1. In this converter, the PFC switch-network and resonant converter primary switch-network are separate from each other. The PFC network interfaces the DC link with one AC port (zO) which is connected to utility AC. The other switch-network interfaces DC link with second AC port (xO) which is connected to resonant network. If the PFC switch network is to be merged with the primary switch network of resonant converter, the resulting network should have two AC ports. One of the AC ports interfaces with the utility AC while the other feeds the resonant network of the resonant converter.

If the PFC stage and the primary side switch network are merged into a single switch network, a reduced the number of required semiconductors is achieved. Further, the semiconductor switches are mostly soft switching, and an increased switching frequency operation with respect to hard switched PFC is employed. Since the two converter stages are not completely decoupled, and the DC link capacitor value can be smaller.

Figure 4:
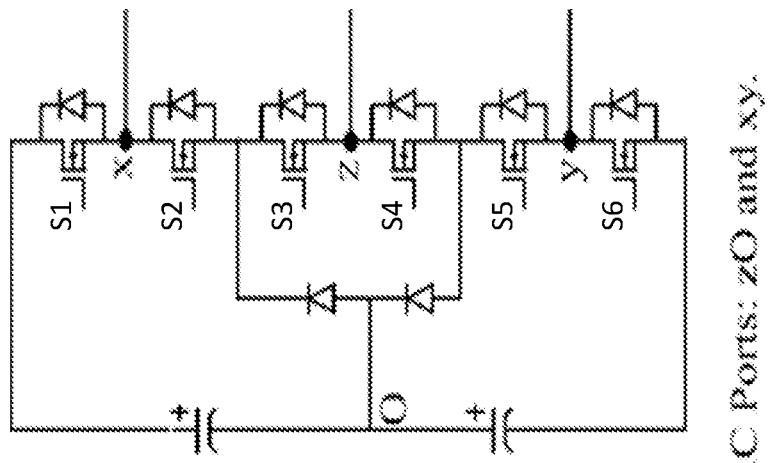
FIG. 4 shows a six switch power converter according to the present invention.
Figure 3:
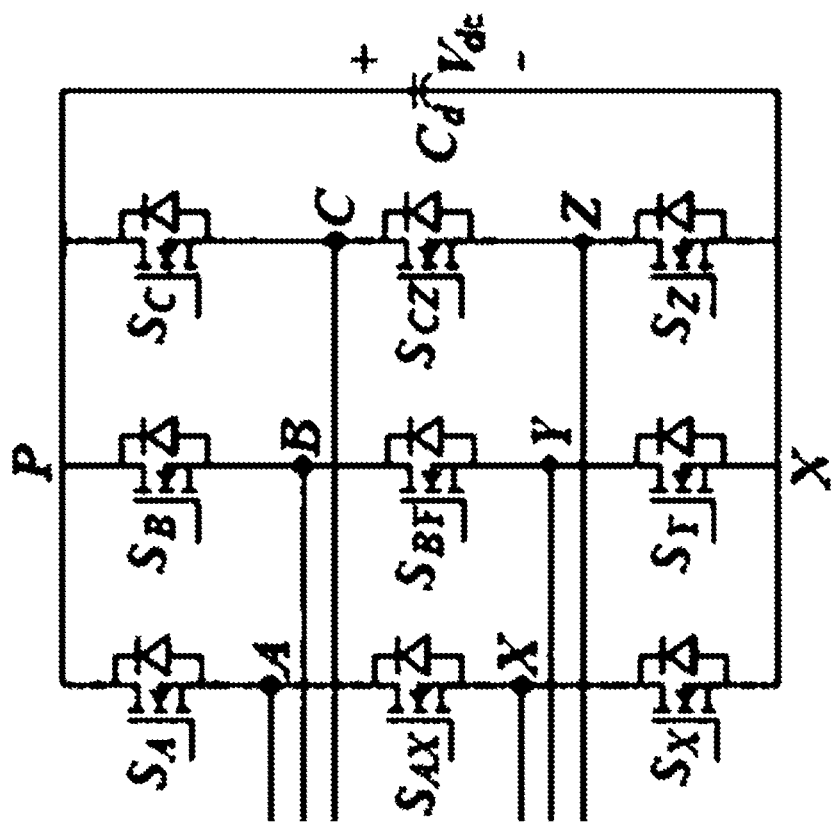
FIG. 3 shows a nine-switch power converter design.

This is accomplished by cascading two additional switches onto the 3-level arm, one on each side and the new network is shown in FIG. 4. This network is tapped between x and y, forming the new AC port, to feed the resonant stage (not shown in FIG. 4).

The switches are driven according to the state Table 1:

TABLE 1

| | Positive Half Cycle | | | | Negative Half Cycle | | |
|---|---|---|---|---|---|---|---|
| | 1-D$_o$ | D$_o$-D$_i$ | D$_i$ | | 1-D$_o$ | D$_o$-D$_i$ | D$_i$ |
| S1 | OFF | ON | ON | S1 | OFF | ON | ON |
| S2 | ON | OFF | ON | S2 | ON | OFF | OFF |
| S3 | ON | ON | ON | S3 | ON | ON | OFF |
| S4 | ON | ON | OFF | S4 | ON | ON | ON |
| S5 | ON | OFF | OFF | S5 | ON | OFF | ON |
| S6 | OFF | ON | ON | S6 | OFF | ON | ON |
| | Zero Period of Resonant AC port | Active Period of Resonant AC port | | | Zero Period of Resonant AC port | Active Period of Resonant AC port | |
| | Zero Period of utility AC port | Active Period of utility AC port | | | Zero Period of utility AC port | Active Period of utility AC port | |

$D_o$ represents the active duty-cycle of the AC voltage pulse waveform produced between nodes x and y which feeds the resonant stage. This duty cycle is constant in each switching cycle. $D_i$ represents the duty cycle of the AC voltage pulse produced between nodes z and O. This duty cycle is sinusoidally varying with respect to time according to the input utility voltage and actively shapes the grid currents.

Each switching cycle can be divided into 3 stages as shown in Table 1. In the first stage, both AC outputs are zero and is achieved by opening switches S1 and S6 and shorting all the remaining switches. It is evident from this switching pattern that the potential of x and y are the same and z is connected to O.

Figure 5:
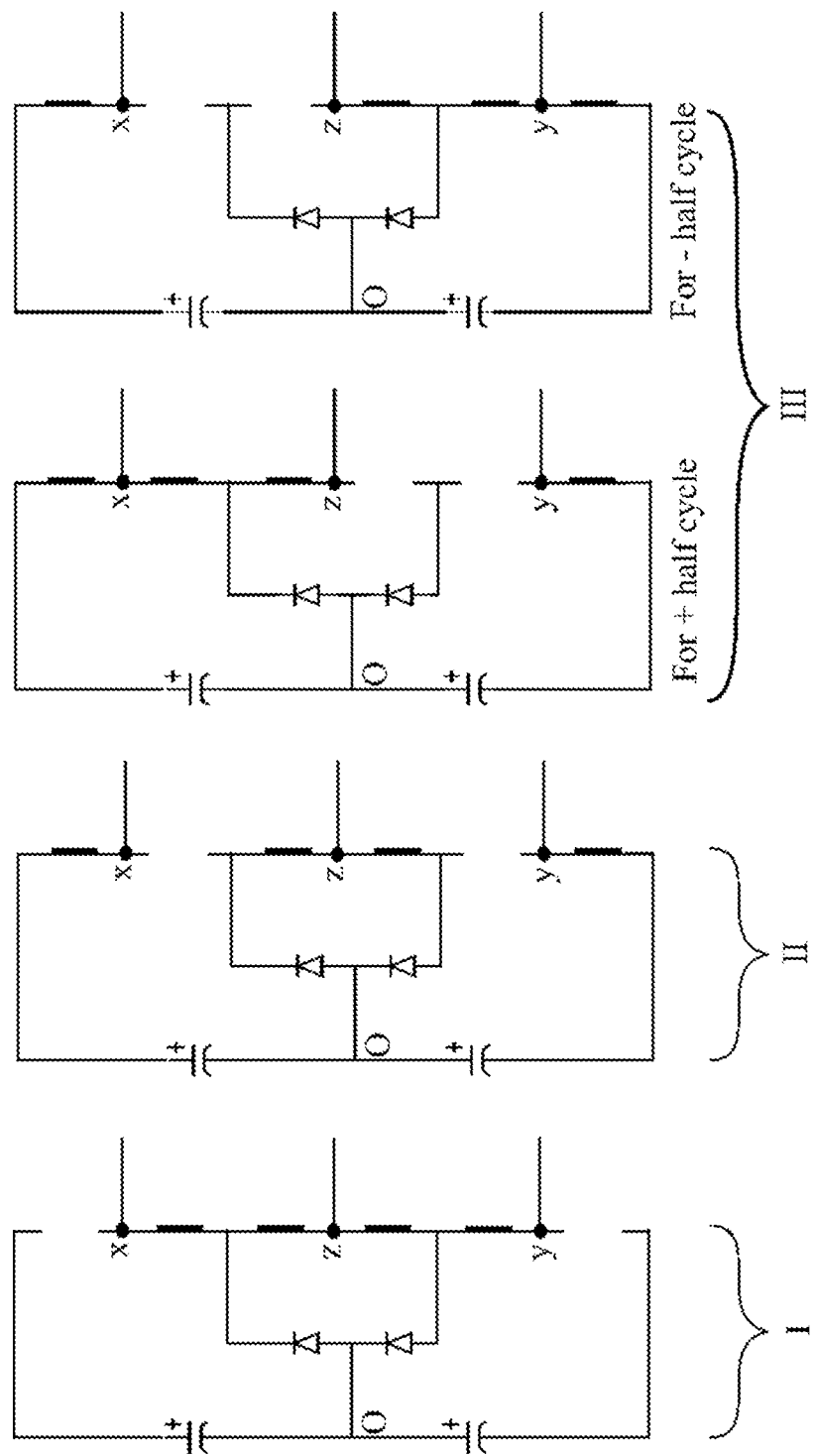
FIG. 5 shows current paths through the six switch power converter according to FIG. 4 in 3 different phases of operation

In the second stage, AC output for resonant stage port is active and that for utility port is zero. This is accomplished by keeping S2 and S5 open and shorting all the remaining switches. The potential between x and y is +Vdc and z is connected to O. In the final stage, both the AC outputs are active. The switching pattern depends on the utility AC voltage polarity. For positive half cycle, S4 and S5 are open and remaining switches are short. The potential between x and y is +Vdc and z is also connected to +Vdc. For negative half cycle, S2 and S3 are open and remaining switches are short. The potential between x and y is +Vdc and z is also connected to −Vdc. In each sub cycle, exactly two switches are open and all other switches are closed. All the switching stages are shown in FIG. 5.

From FIG. 4, it is evident that the node x is between node +Vdc and z; node y is in between z and −Vdc. Hence, the active period of inner AC port can be equal or less than that of outer AC port, $D_i < D_o$. Ideally, for greater power transfer to the resonant stage, $D_o$ should be ½. This will restrict $D_i$ also to ½ and the DC link utilization is low. As a compromise between DC link utilization and power transfer to resonant stage, $D_o = 0.6$ is chosen. However, it should be understood that different contexts may lead to different optimal duty cycles.

Figure 6A:
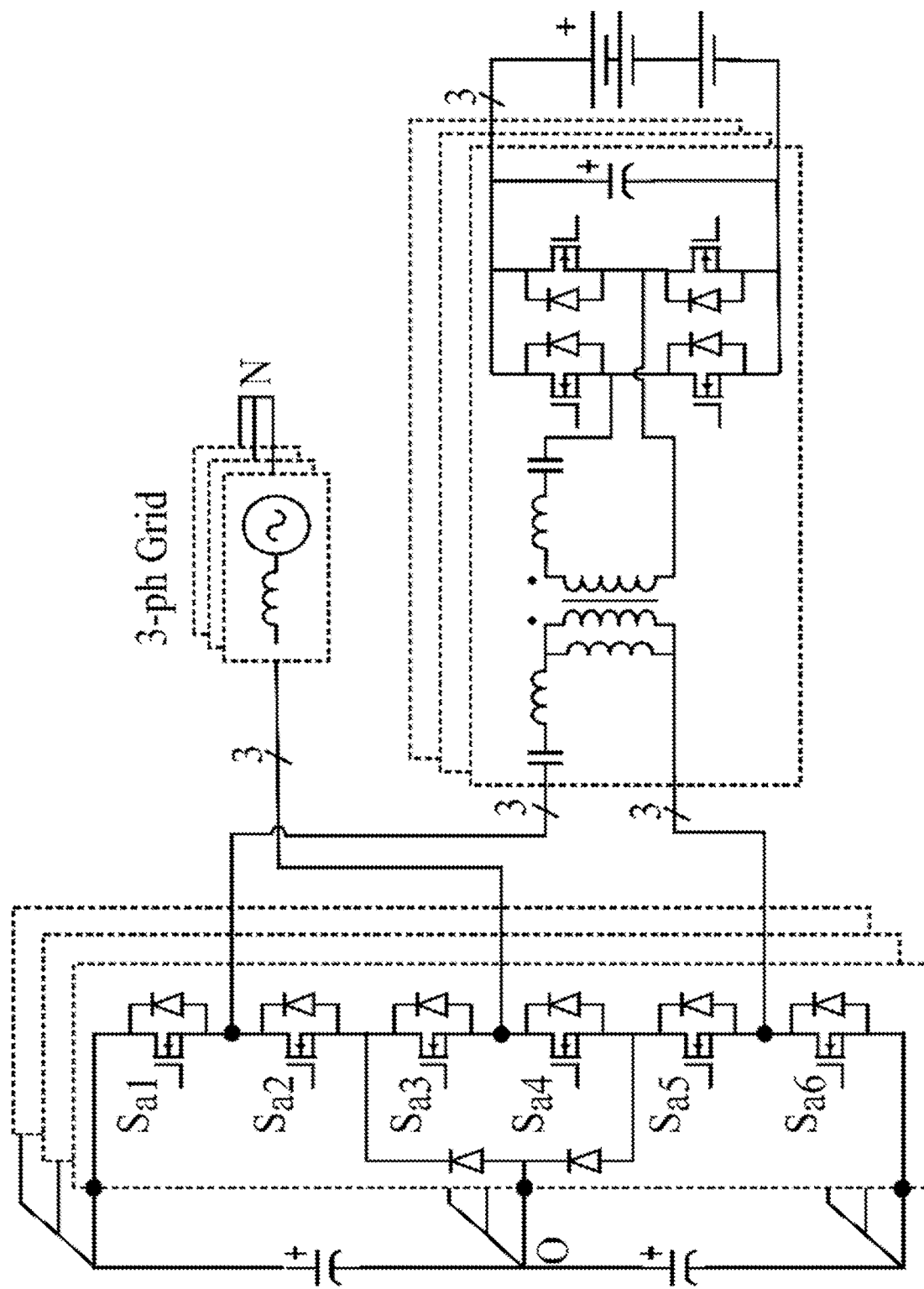
FIG. 6A shows the converter according to FIG. 4 in conjunction with a synchronous bridge resonant second stage, for each of 3 phases in a battery charging configuration.
Figure 6B:
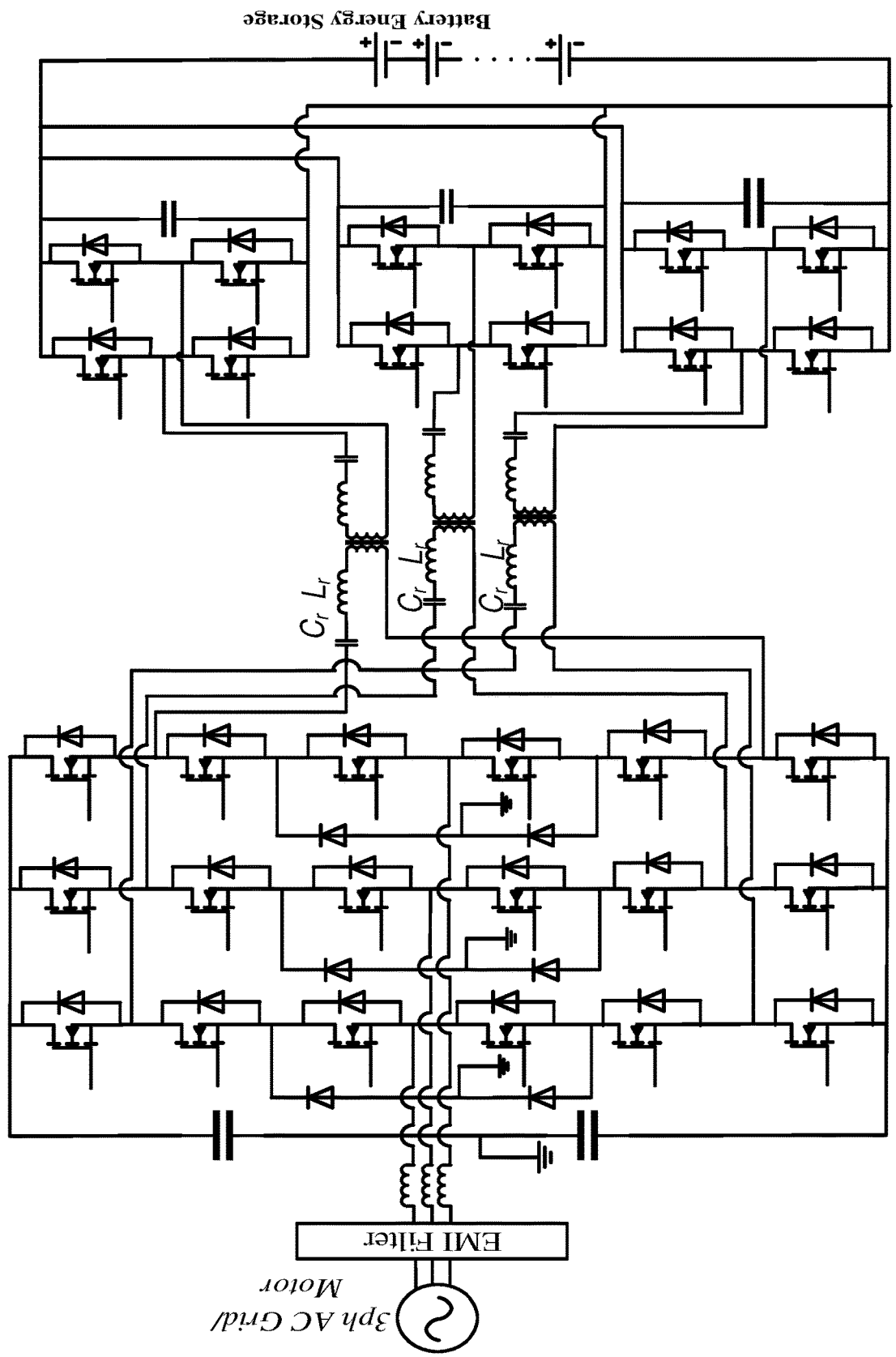
FIG. 6B shows the circuitry for each phase of the 3-phase circuit for charging a battery.
Figure 6C:
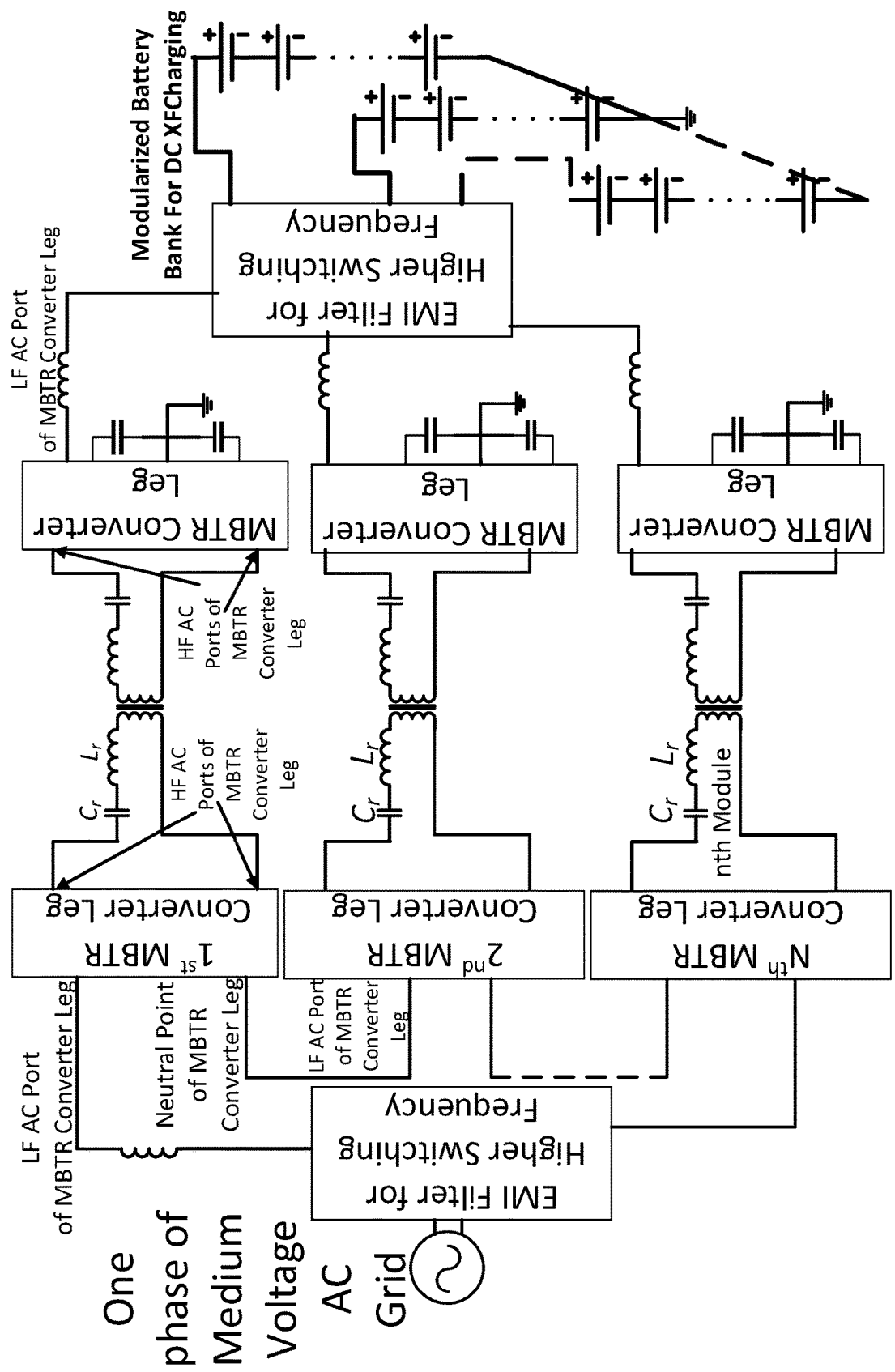
FIG. 6C shows a schematic diagram of the circuit of FIG. 6B, with output filters.

The complete schematic of the 3-ph AC-DC Multilevel-Bridge tapped Resonant converter is shown in FIGS. 6A and 6B. FIG. 6A shows a single phase, while FIG. 6B shows all three phases. FIG. 6C shows a schematic representation of FIG. 6B, with output filters.

Figure 6D:
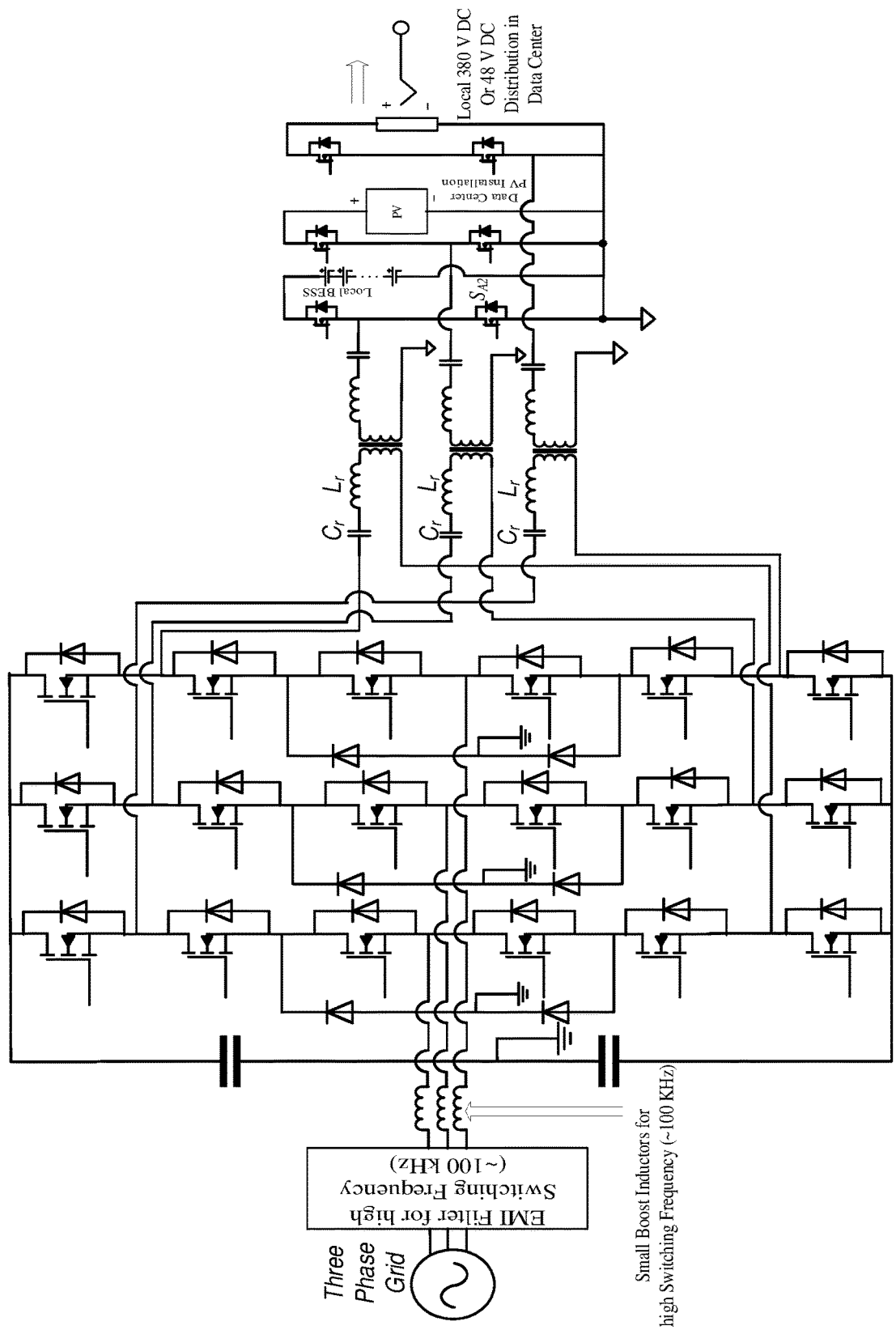
FIG. 6D shows a 3-phase AC-DC power converter having a two-switch resonant second stages.
Figure 6E:
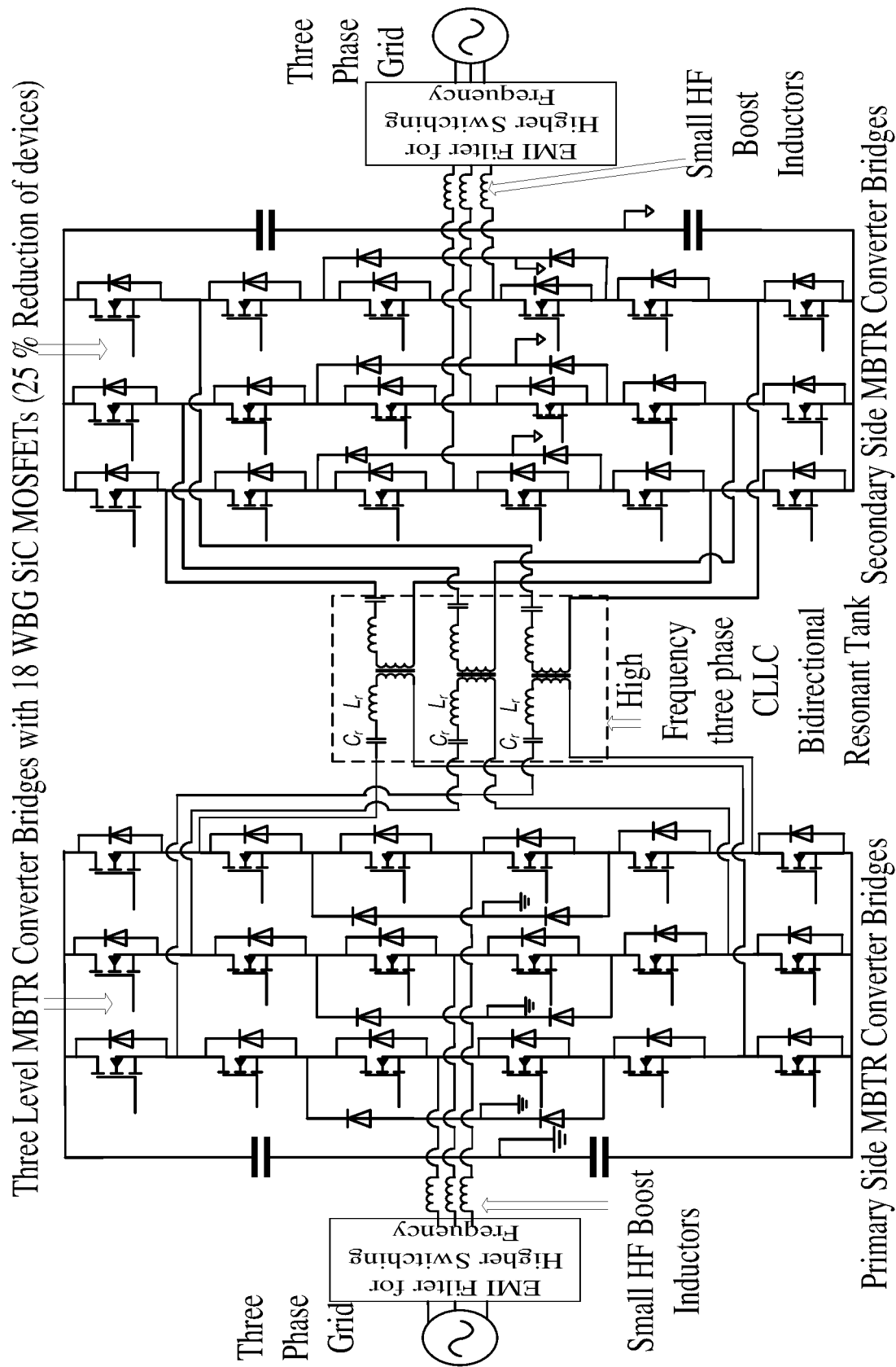
FIG. 6E shows a relatively symmetric (except accommodations for operating frequency) circuit having 6-switch converters in each of the first stage and the second stage, permitting bidirectional AC-AC conversion.

FIG. 6D shows a similar architecture to that in FIG. 6B, but with a half-bridge synchronous converter second stage. FIG. 6E shows a symmetric AC-AC bidirectional converter architecture, with six switches per phase for each phase of the input and output.

The converter (in this case configured as a battery charger) consists of 3 limbs with the first stage of each limb assembled by using 6 semiconductors switches and 2 diodes.

The resonant converter of each phase consists of a resonant network and four-switch full-bridge converter connected to the respective battery. Note that a single battery or three separate batteries may be employed.

For any N-level PFC, the modified integrated network can be built using the same procedure discussed before. In an N-level converter, each limb has 2×N semiconductor switches and (N−1)×(N−2) diodes. The above switching pattern can be easily implemented using a modulating scheme described below.

Figure 8:
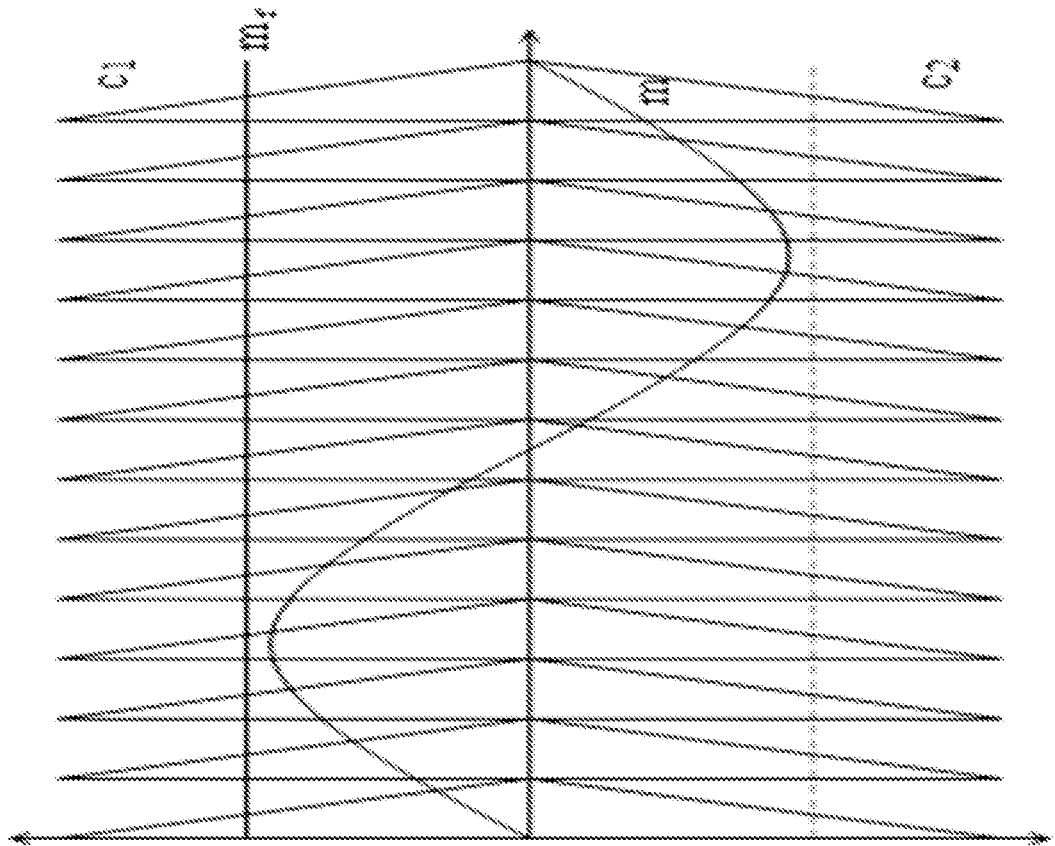
FIGS. 7 and 8 show gate drive signal logic and waveforms for a first embodiment of the invention, with a sinusoidal reference waveform.
Figure 7:
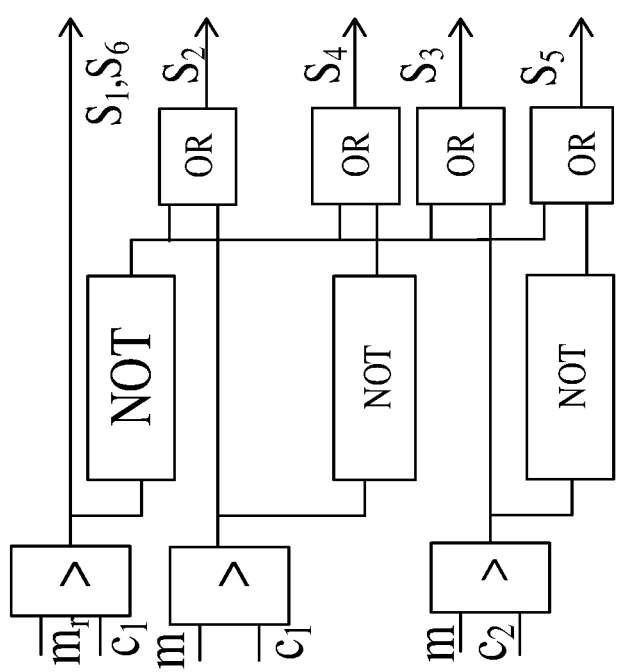

Two Phase Opposition Disposition carrier waves are compared with two modulating waves to generate the switching pulses which control the semiconductor switches of the converter. The switching logic is shown in FIG. 7, and the associated waveforms in FIG. 8.

The first modulating signal, denoted as $D_o$, is constant as discussed above and defines the duty cycle of the voltage pulse fed to the asymmetric resonant converter. The second modulating signal, denoted as $d_i$, is an alternating sinusoidal signal at grid frequency. The carriers of each phase leg are again shifted by 120 degrees with respect to those of other two legs. This creates a similar phase shift between the input voltages of resonant networks of each phase, resulting in an interleaving effect of output currents, thus reducing the output filter size at the battery terminals. Since the converter is three phase, triplen harmonics can be added in each phase which will cancel out each other in line voltages to improve the DC link utilization. Hence, the modulating signal $d_i$ can be obtained from a space vector algorithm.

Figure 10:
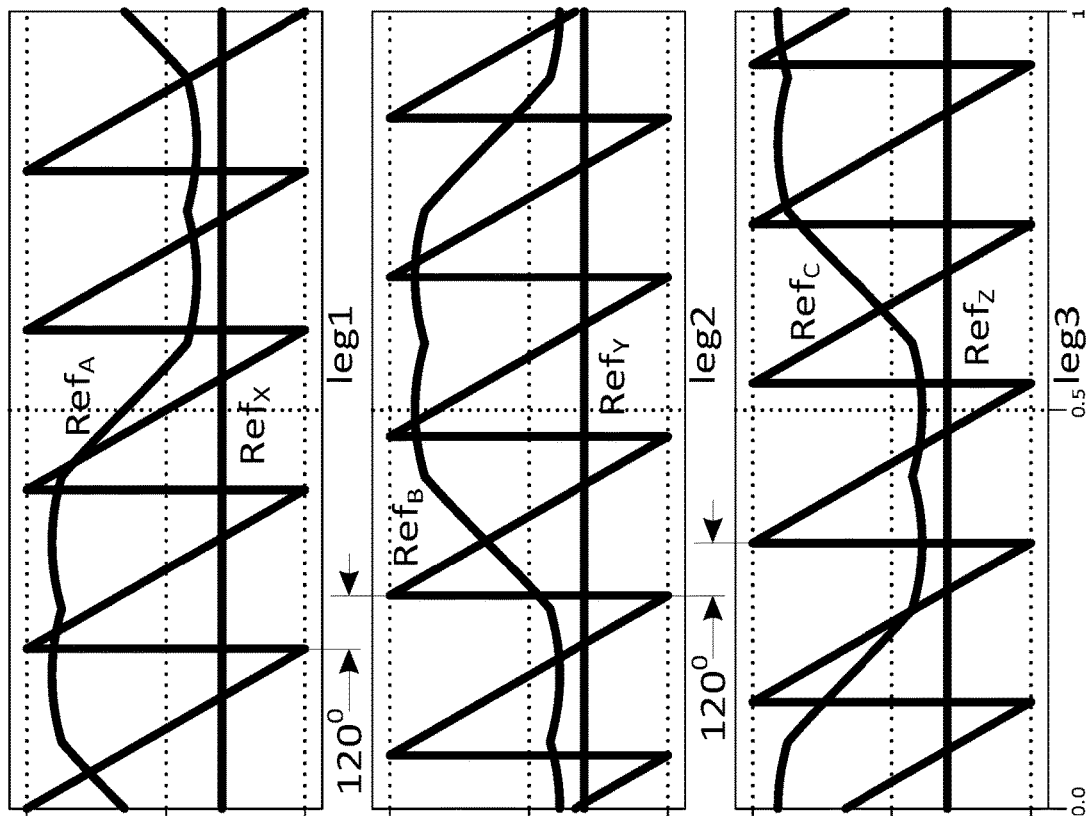
FIGS. 9 and 10 show gate drive signal logic and waveforms for a second embodiment of the invention with a multimodal reference waveform.
Figure 9:
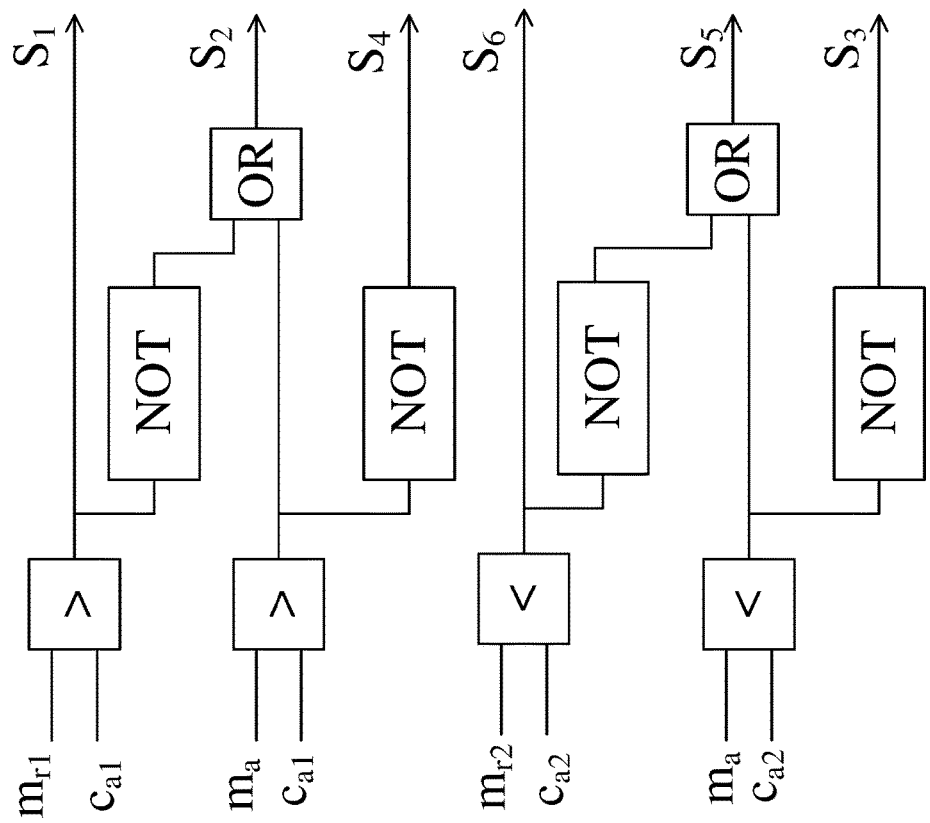

In another embodiment, the switching logic is provided in FIG. 9 (for phase A), and the waveforms shown in FIG. 10. Note that, since each phase is separately controlled, phase-specific corrections may be employed as appropriate to the control of the switch matrix.

Figure 11:
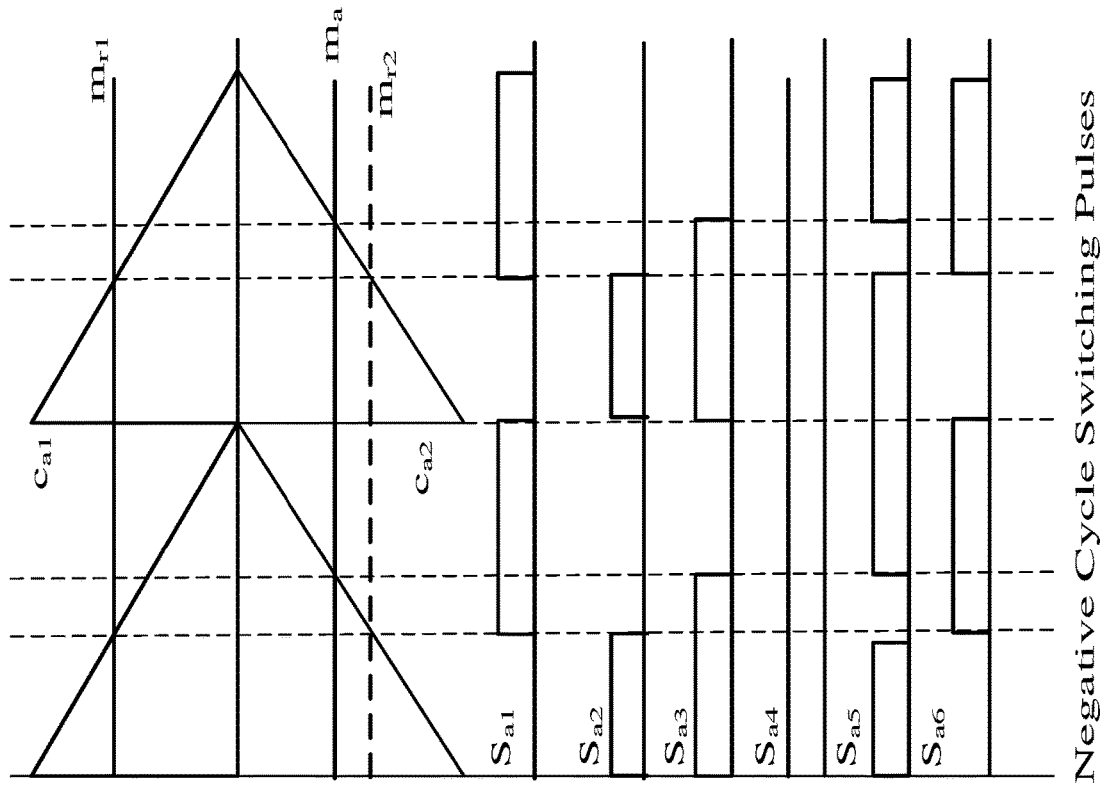
FIG. 11 shows the resulting pulses for switches for phase A.
Figure 11:
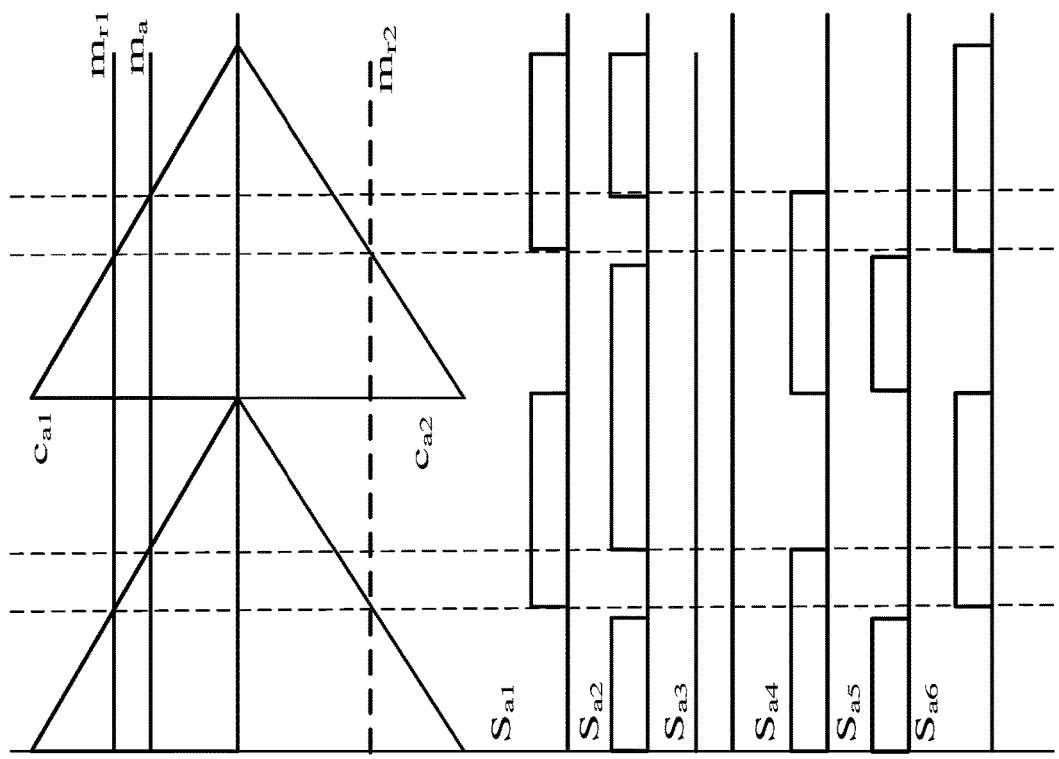

FIG. 11 shows the resulting pulses for switches for phase A. It is particularly noted that the switches are driven such that the falling edge of a gate drive pulse precedes the rising edge of the subsequent gate drive pulse, so that the on-states are non-overlapping between adjacent switches.

Figure 12:
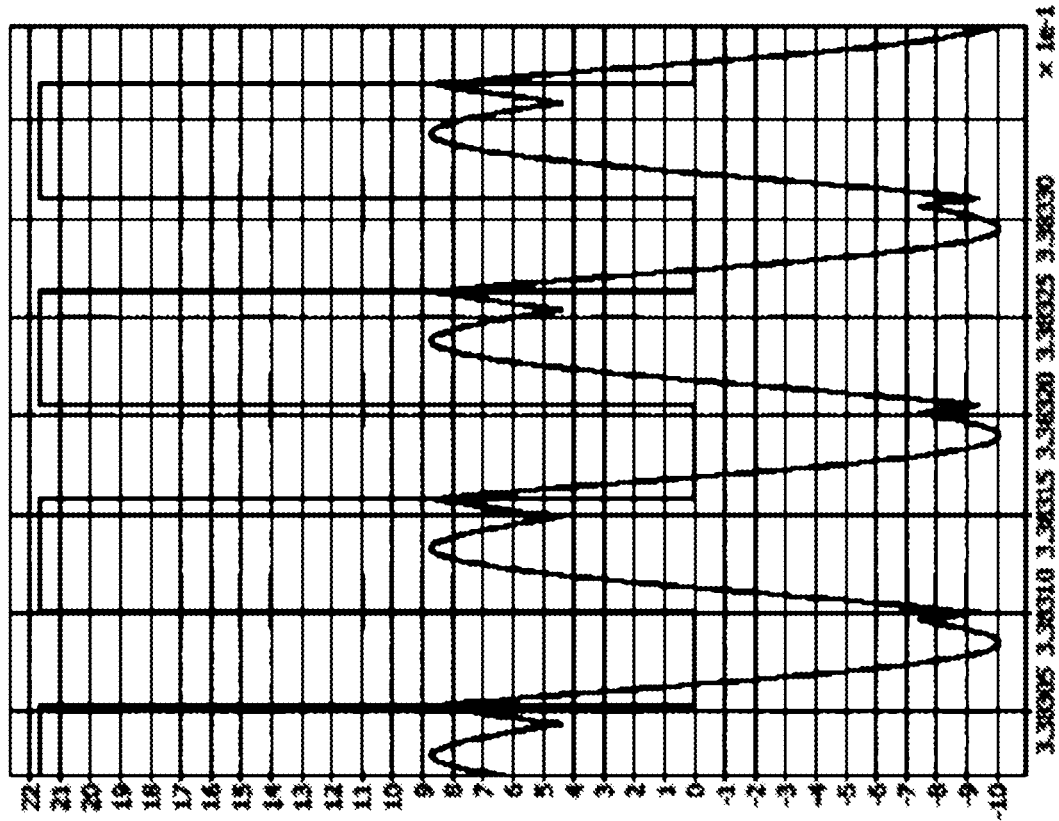
FIG. 12 shows, for transformer primary side phase A, the voltage across switch node points x-y, and the phase A resonant current.

FIG. 12 shows, for transformer primary side phase A, the voltage across switch node points x-y, and the phase A resonant current.

Figure 13:
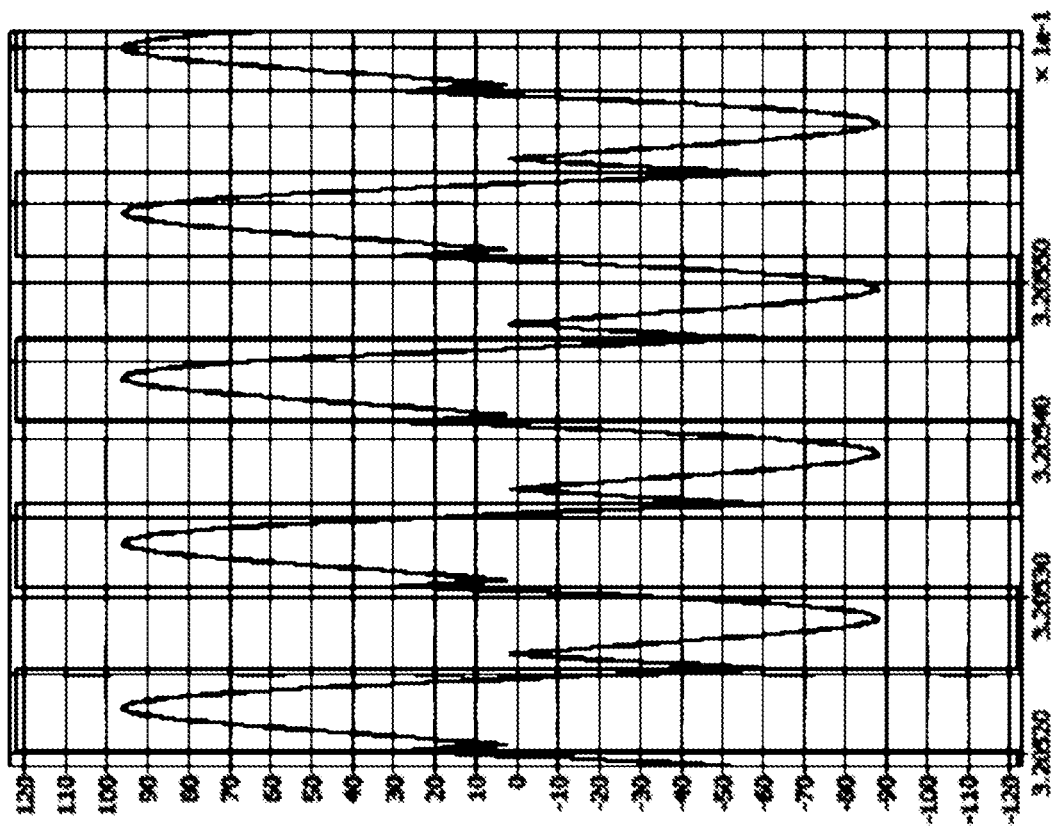
FIG. 13 shows, for transformer secondary side phase A, the voltage across switch node points x-y, and the phase A resonant current.

FIG. 13 shows, for transformer secondary side phase A, the voltage across switch node points x-y, and the phase A resonant current.

The converter provides the following advantages over an eight-switch first stage single level power converter:

The semiconductor switches are reduced in number.

The rated voltage of the semiconductor switches is reduced. This will reduce the ON resistance of the switch positively impacting the efficiency.

Since the number of levels in voltage is increased, the THD of currents is reduced.

The volume of PFC inductors is reduced.

It can be used in medium-level voltage applications.

It has faster PFC response by virtue of higher switching frequency.

The DC link voltage level in the proposed converter is higher than that of the traditional converter. This can be lowered by using advanced pulse width modulating strategies.

Figure 14:
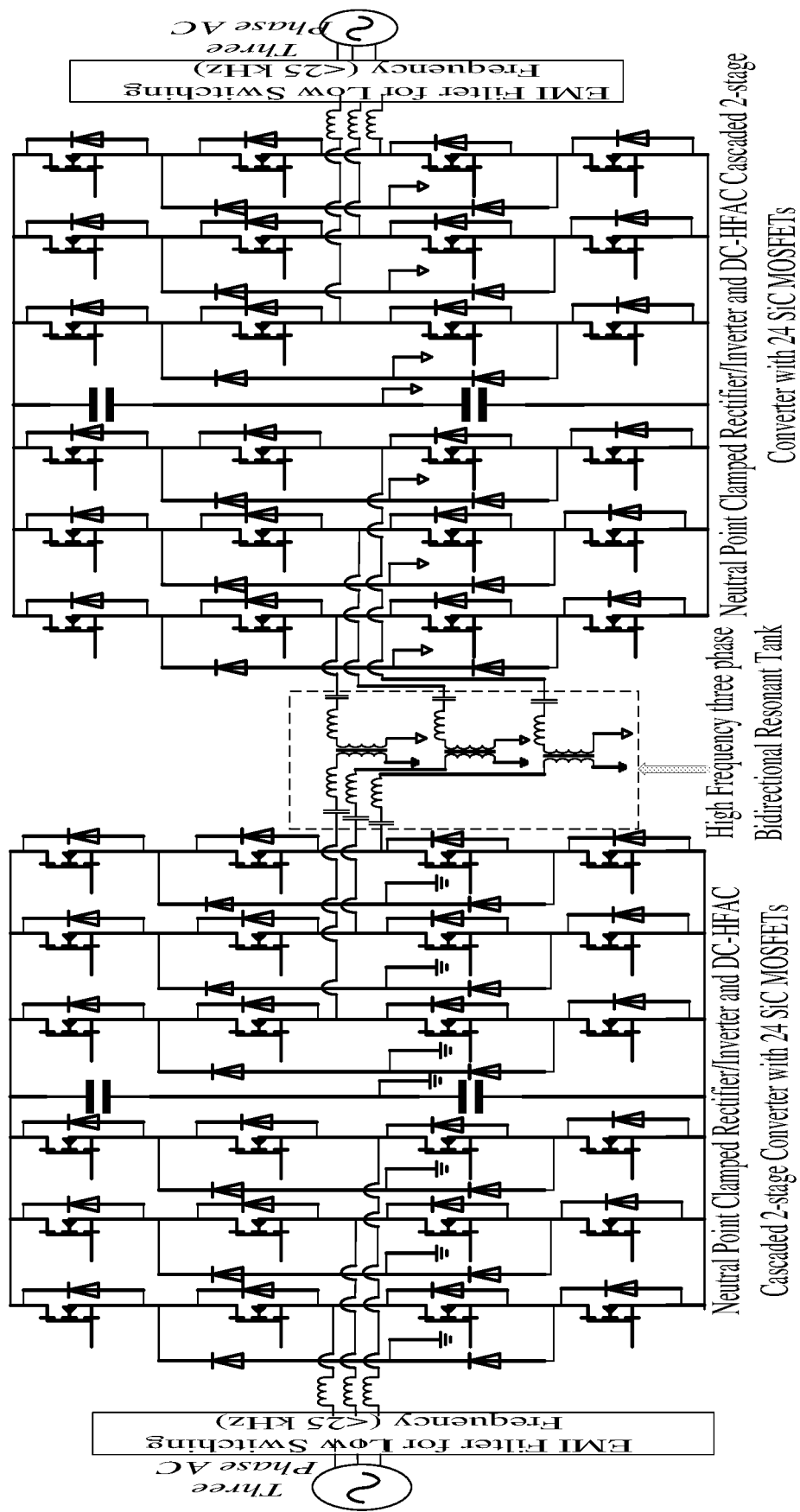
FIG. 14 shows a prior art style converter with 8 switches per phase at both the first stage and the second stage.

The design is contrasted with a prior art design that uses eight switches per phase for the PFC first stage, and in this case, eight switches per phase for the synchronous second stage, as shown in FIG. 14, for an AC-to-AC bidirectional converter.

Figure 15:
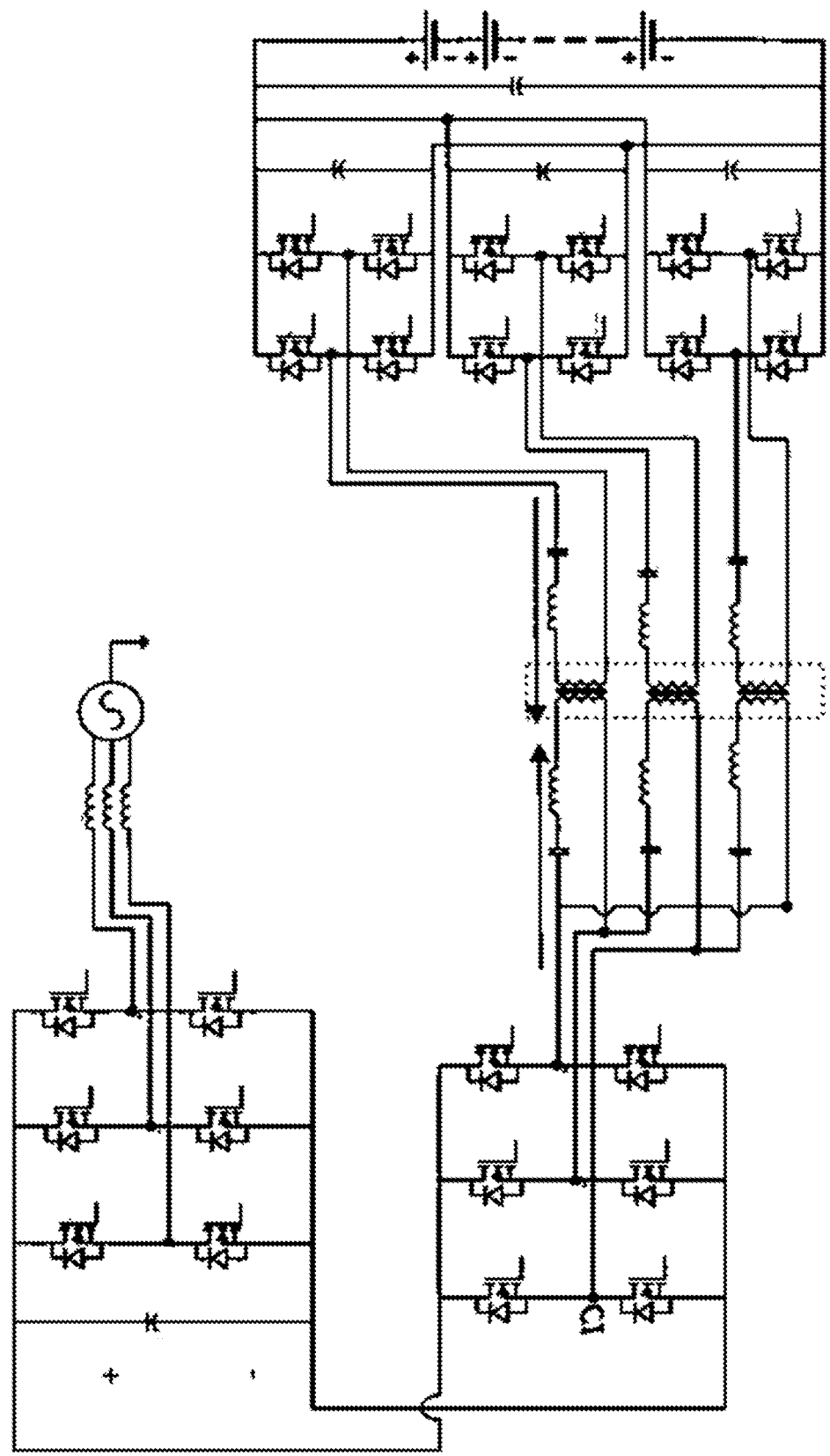
FIG. 15 shows a prior art style converter design including the 6-switch matrix according to FIG. 2.

An alternate with twelve switches for three phases is shown in FIG. 15, which shows a similar second resonant stage which charges a single battery stack. This design employs a single level PFC stage, with integrated phases, and thus incurs various disadvantages as discussed above.

The present invention integrates the front-end boost PFC rectifier and the high frequency converter stage of the resonant converter into a single stage low frequency AC to high frequency AC front-end converter. This modified front end feeds the resonant tank and the rectifier stage forming the complete AC-DC converter.

The input ports of the resonant tanks are connected in delta form. The interleaved three phase modulation results in a bipolar voltage input to the resonant tank, and hence the series capacitors in the resonant tank are relieved from blocking the DC voltage. This reduces the stress on these capacitors and increases the stability and the lifetime of the converter. Moreover, the interleaved modulation results in 120-degree phase between the inputs of each resonant tank and hence reduces the DC ripple and the filter size on the rectifier side.

Moreover, various switches in present converter are soft switched allowing higher intermediate AC switching frequencies, and hence can use low volume magnetic components and capacitors, as compared to configurations that employ lower intermediate AC switching frequencies, which require physically larger magnetic components (inductors, transformers) and capacitors. Further, the configuration reduces the stress on the capacitors enabling the stability and long life for the converter.

The present converter may integrate a front-end boost PFC rectifier and a high frequency converter stage of a typical resonant converter, into a single stage low frequency AC to high frequency AC front-end converter.

It is noted that the architecture employs conventional three-phase power, and the design may be readily scaled to accommodate a larger number of phases in less conventional system architectures.

As discussed above, while the present design provides three levels, with additional switches and correspondingly more complex control logic, a greater number of levels may be employed.

Figure 16:
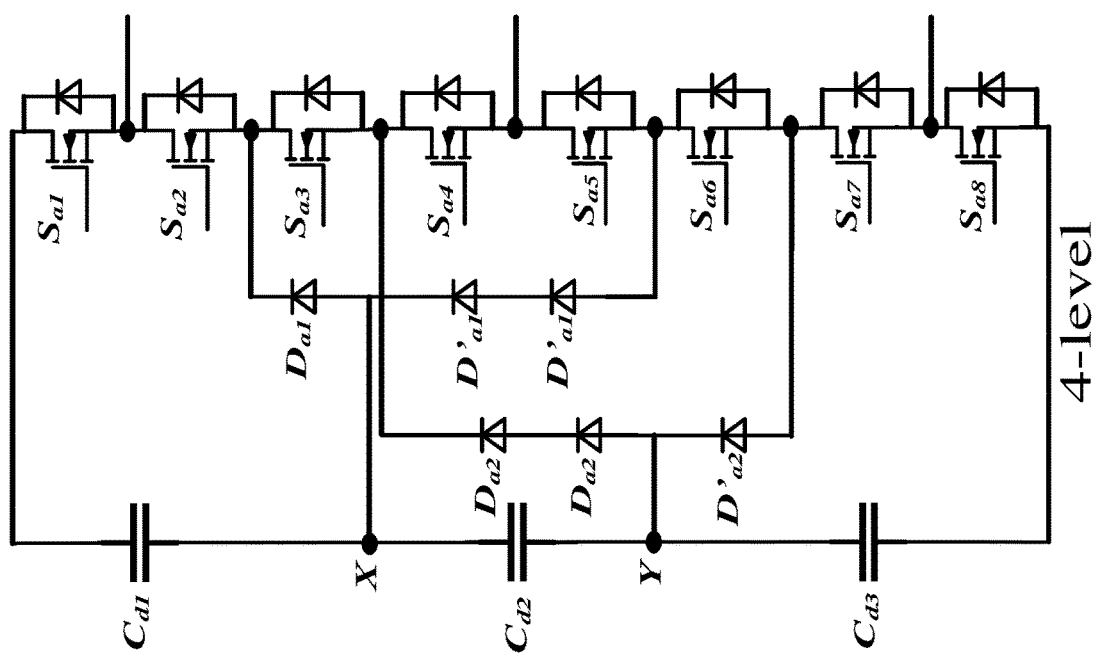
FIG. 16 shows an 8-switch, 4-level converter according to the present invention.

FIG. 16 shows a 4-level configuration.

Figure 17:
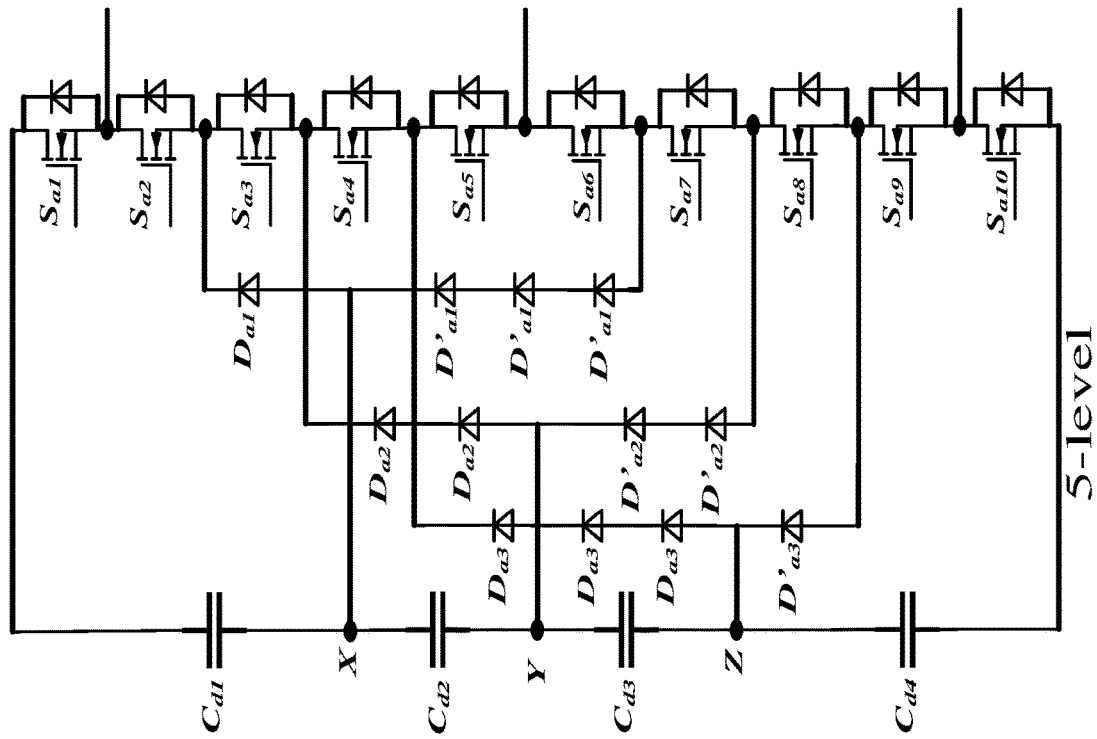
FIG. 17 shows a 10-switch, 5-level converter according to the present invention.

FIG. 17 shows a 5-level architecture.

Each phase has an input structure comprising six switches (MOSFETs) in series, between a positive and negative rail, the input of each phase being the three upper and three lower switches. Between the rails are a pair of capacitors in series, whose junction is the O node. A pair of diodes extend from node O to the junction of the second and third, and third and fourth switches, respectively, and are reverse biased with respect to the rails. The outputs are between the first and second, and fifth and sixth switches.

The switches in series are driven to synchronously rectify the input AC frequency, and produce the output at the high AC frequency. The high frequency is passed through a tank circuit and transformer to a set of bridges run at the high AC frequency, which may be either three-phase interleaved full bridges or triple single phase parallel full bridges.

A 12 kW prototype is built which interfaces a three-phase, 480V AC line to charge or discharge a battery with terminal voltage ranging from 390V-780V.

900V rated SiC MOSFETs are used for switches in AC side network whereas 1200V rated switches are used in the DC side switch network.

The converter design can be easily modified for any other AC mains and battery voltage levels. Table 2 shows a bill of materials for the prototype.

TABLE 2

Power Circuit Board

| Manufacturer Part Number | Description |
| --- | --- |
| B81123C1102M000 | CAP FILM 1000 PF 20% 500VAC RAD |
| M20-7820442 | CONN RCPT 4POS 0.1 GOLD PCB |
| T9GV2L14-12 | RELAY GEN PURPOSE SPST 20 A 12 V |
| 1792229 | TERM BLOCK 2POS 30 DEG 7.5 MM PCB |
| FDFS6N548 | MOSFET N-CH 30 V 7 A 8-SOIC |
| CR201-25AE | ALUMINUM HEATSINK 25 MM BLK ANODI |
| R76UN22204040J | CAP FILM 0.022UF 5% 2KVDC RADIAL |
| B32653A0473J000 | CAP FILM 0.047UF 5% 1KVDC RADIAL |
| RT8532-20-2M5 | CMC 2.5 MH 20 A 3LN TH |
| 282858-4 | TERM BLK 4P SIDE ENTRY 10 MM PCB |
| CR201-75AE | ALUMINUM HEATSINK 75 MM BLK ANODI |
| C3M0030090K | ZFET 900 V, 30 MOHM, G3 SIC MOSFE |
| B32653A2472K000 | CAP FILM 4700 PF 10% 2KVDC RADIAL |
| R75UR32204040J | CAP FILM 0.22UF 5% 2KVDC RADIAL |
| C3M0075120K | MOSFET N-CH 1200 V 30 A TO247-4 |
| UPH2G221MHD | CAP ALUM 220UF 20% 400 V RADIAL |
| ASB03512HB-F00 | FAN AXIAL 35 × 15 MM 12VDC WIRE |
| CM5441Z101B-10 | CMC 75 A 2LN 100 OHM TH |
| TMDSDOCK28379D | EXPERIMENTER TMS320F28379D EVAL |
| TXM 075-112 | AC/DC CONVERTER 12 V 72 W |
| GCM32DC72A475KE02L | CAP CER 4.7UF 100 V X7S 1210 |
| ACM4520V-142-2P-T00 | CMC 1 A 2LN 1.4 KOHM SMD AEC-Q200 |
| R75UR32204040J | CAP FILM 0.22UF 5% 2KVDC RADIAL |
| C4D20120A | DIODE SCHOTTKY 1.2 KV 20 A TO220-2 |

The first stage of the converter provides multilevel operation, see FIG. 4, which employs two switches per level, and saves two switches per phase as compared to the prior art embodiment of FIG. 1, while obtaining the benefits of multiphase operation, including soft switching on most switches, and reduced stress. As shown in FIG. 10, the reference $Ref_A$, $Ref_B$, $Ref_C$ waveforms have a transition that is offset from the peak of the sawtooth, in 6 phases, an ascending phase, followed by two high states, a descending phase, and two low states. These are offset for each phase. The switch signals are timed to avoid overlapping on states between adjacent switches S1 and S2, and S4 and S5. For the positive cycle switching pulses, S3 is on, and for negative cycle switching pulses, S4 is on.

The switches are mostly soft switched, leading to reduced electromagnetic interference with respect to the traditional design in which the first stage switches are hard switched at the low frequency.

While the invention has been described with respect to illustrative embodiments thereof, it will be understood that various changes may be made to the embodiments without departing from the scope of the invention. Accordingly, the described embodiments are to be considered merely exemplary and the invention is not to be limited thereby.

What is claimed is:

1. A multilevel stage of an AC power converter having at least three levels, comprising:
   a set of switches in series, comprising two switches per level;
   a set of capacitors in series, having one less capacitor than the number of levels, the set of capacitors being in parallel with the set of switches;
   a clamping network interconnecting nodes of the set of switches with nodes of the set of capacitors, to establish incremental voltages across the set of capacitors;
   a center tap along the set of switches in series; and
   a pair of taps, respectively after the first and before the last switch of the set of switches in series;
   wherein the set of switches are operable to transfer power between the center tap operating at a first AC frequency and the pair of taps operating at a second AC frequency.

2. The multilevel stage of an AC power converter according to claim 1, wherein:

the clamping network comprises a number of sets of
diodes in series corresponding to the number of levels
minus two, defining a unidirectional current flow direction along the respective set of diodes, nodes between respective capacitors are connected to a single node between respective diodes of a respective set of diodes, each set of diodes connecting nodes between respective switches spaced by one less than the number of levels starting after the second switch and ending before the second to last switch, such that the number of switches and the number of diodes in parallel is the same, and the connection between the node between respective capacitors and the single node between respective diodes of a respective set of diodes is made such that the number of capacitors beneath the connection node is equal to the number of diodes beneath the connection node.

3. The multilevel stage of an AC power converter according to claim 1, wherein the center node is connected to a phase of a multiphase power source.

4. The multilevel stage of an AC power converter according to claim 1, wherein the center node is connected to a phase of a multiphase power sink.

5. The multilevel stage of an AC power converter according to claim 1, wherein the pair of taps are connected to a resonant synchronous rectifier.

6. The multilevel stage of an AC power converter according to claim 1, wherein the pair of taps are connected to a second multilevel power converter having at least three levels, comprising:
a second set of switches in series, comprising twice the number of switches as levels;
a second set of capacitors in series, having one less capacitor than the number of levels, the second set of capacitors being in parallel with the second set of switches;
second clamping network interconnecting nodes of the second set of switches with nodes of the second set of capacitors, to establish incremental voltages across the second set of capacitors;
a second center tap along the second set of switches in series; and
a second pair of taps, respectively after the first and before the last switch of the second set of switches in series.

7. The multilevel stage of an AC power converter according to claim 1, further comprising a controller configured to control the first set of switches to interface an AC voltage having a first waveform at the center tap with a DC voltage across the set of capacitors, and to interface the DC voltage across the set of capacitors with an AC voltage having a second AC waveform at the pair of taps, the first waveform and the second waveform being different.

8. The multilevel stage of an AC power converter according to claim 1, further comprising:
a transformer and a resonant tank circuit;
a synchronous bridge rectifier comprising a set of switches in series; and
a controller configured to:
control the first set of switches and the set of switches to convert an AC current into a first DC voltage across the set of capacitors,
control the first set of switches to generate a resonant AC waveform to transfer power through the transformer to the synchronous bridge rectifier, and
control the synchronous bridge rectifier to produce a second DC voltage.

9. The multilevel stage of an AC power converter according to claim 1, configured to operate with a phase of an AC voltage signal between 50 and 500 VAC RMS applied to the center tap.

10. The multilevel stage of an AC power converter according to claim 1, further comprising a tank circuit comprising a capacitor and an inductor and having a resonant frequency between 2 kHz-1 MHz, which interfaces with the pair of taps.

11. The multilevel stage of an AC power converter according to claim 1, further comprising:
a resonant tank circuit, connected to a node between two of the set of switches in series;
a synchronous converter, configured to interface with a secondary power system;
a coupling transformer, configured to couple power from the resonant tank circuit to the synchronous converter; and
a controller, configured to control the switches and the synchronous converter, to transfer power from a multiphase AC system supplying power to the AC power converter to a load on the synchronous converter.

12. The multilevel stage of an AC power converter according to claim 11, wherein the multiphase AC system supplying power to the AC power converter operates at a frequency of 50 to 400 Hz and wherein the controller is configured to control the switches to generate a waveform having a frequency of greater than 10 kHz at the pair of taps.

13. The multilevel stage of an AC power converter according to claim 1, further comprising an automated controller, configured to:
control the set of switches in a startup sequence to charge the set of capacitors, and after the capacitors are charged, to control the set of switches in an operating sequence different from the startup sequence; and
to perform power factor correction.

14. The multilevel stage of an AC power converter according to claim 1, wherein power transferred through the pair of taps interfaces with at least one of a rechargeable battery, a motor, a generator, and a motor-generator.

15. An AC power converter having a number of levels N, wherein N is at least 3, comprising:
a set of switches in series, comprising (N×2) switches, having a center tap and a pair of taps after the first and before the last switches;
(N−1) capacitors in series, the (N−1) capacitors in series being in parallel with the set of switches in series; and
a clamping network communicating with nodes between the set of switches, configured to establish monotonically increasing voltages at sequential nodes between the capacitors in series,
wherein the switches, clamping network and capacitors are configured to generate, from a first AC waveform at the center tap and a controlled sequence of switching signals, a DC voltage across the capacitors in series, and a second AC waveform from the pair of taps.

16. The AC power converter according to claim 15, wherein the clamping network comprises (N−2) sets of diodes, wherein nodes between respective capacitors are connected to nodes between respective diodes, each set of diodes bridging a respective node between respective switches spaced by one less than the number of levels starting after the second switch and ending before the second to last switch.

17. The AC power converter according to claim 15, further comprising:

a resonant tank circuit, connected between two of the set of switches in series;

a synchronous converter, configured to interface with a secondary power system;

a coupling transformer, configured to couple power from the resonant tank circuit for each respective phase of a multi-phase AC system to the synchronous converter; and a controller, configured to control the set of switches and the synchronous converter, to transfer power from the multiphase AC system to a load on the synchronous converter.

18. A method of power conversion, comprising:

providing a multilevel stage of an AC power converter having at least three levels, comprising:
- a set of switches in series, comprising two switches per level, having a center tap and a pair of taps before the first and last switches;
- a set of capacitors in series, the set of capacitors in series being in parallel with the set of switches in series;
- a clamping network, interconnecting nodes between switches of the set of switches and nodes between capacitors of the set of capacitors, configured to establish different operating voltages at nodes between the set of capacitors;

interfacing the center tap with a first AC system;

interfacing the pair of taps with a second AC system, wherein an AC waveform of the first system is different from an AC waveform of the second AC system; and automatically controlling a sequence of switching signals for the set of switches to generate a DC voltage across the set of switches in series and the capacitors in series, and to transfer power between the first AC system and the second AC system.

19. The method according to claim 18, wherein the clamping network comprises sets of diodes which transfer a unidirectional current from a node between switches to a node between capacitors, each set of diodes connecting nodes between respective switches spaced by one less than the number of levels starting after the second switch and ending before the second to last switch, to establish a voltage gradient on the successive nodes of the set of capacitors.

20. The method according to claim 18, further comprising:

providing a synchronous converter as the second AC system, the synchronous converter receiving power from the pair of taps and driving a load; and automatically controlling the synchronous converter, to transfer the power from the pair of taps through the synchronous converter to the load.

* * * * *